(12) United States Patent
Ruhm et al.

(10) Patent No.: US 7,184,725 B2
(45) Date of Patent: Feb. 27, 2007

(54) POLE SWITCH DOWN CONVERTER WITH SYMMETRIC RESONATOR

(75) Inventors: Ingo Ruhm, Vierkirchen (DE); Ralf Böhnke, Esslingen (DE)

(73) Assignee: Sony Deutschland GmbH, Köln (DE)

( * ) Notice: Subject to any disclaimer, the term of this patent is extended or adjusted under 35 U.S.C. 154(b) by 28 days.

(21) Appl. No.: 11/126,035

(22) Filed: May 9, 2005

(65) Prior Publication Data

US 2005/0255820 A1 Nov. 17, 2005

(30) Foreign Application Priority Data

May 11, 2004 (EP) .................................. 04011185

(51) Int. Cl.
*H04B 17/02* (2006.01)
*H04B 1/18* (2006.01)
*H04B 1/16* (2006.01)

(52) U.S. Cl. ................ 455/138; 455/192.1; 455/192.2; 455/209; 455/323

(58) Field of Classification Search .................. 455/42, 455/73, 78, 108, 130, 138, 141, 161.1, 161.2, 455/191.1, 191.2, 205, 209, 323, 326, 334, 455/338, 339

See application file for complete search history.

(56) References Cited

U.S. PATENT DOCUMENTS 6,061,551 A * 5/2000 Sorrells et al. ............. 455/118
6,292,654 B1 * 9/2001 Hessel et al. ............... 455/223
6,813,485 B2 * 11/2004 Sorrells et al. ............. 455/313
7,065,162 B1 * 6/2006 Sorrells et al. ............. 375/343

OTHER PUBLICATIONS

Hernandez L et al: "A superregenerative receiver for phase and frequency modulated carriers" Circuits and Systems, 2002. ISCAS 2002. IEEE International Symposium On, vol. 3, May 29, 2002, pp. III-81-III-84, XP002299696.

* cited by examiner

*Primary Examiner*—Kieu-Oanh Bui
(74) *Attorney, Agent, or Firm*—Oblon, Spivak, McClelland, Maier & Neustadt, P.C.

(57) ABSTRACT

A pole switch down-converter with symmetric resonator which reduce the non resonating phase to approximately half of the RF carrier period of the modulated signal is proposed. The down-converter comprises a first and second λ/2 resonator for collecting RF energy, wherein a differential RF signal is coupled to the first and second λ/2 resonator, a switching means coupled at one end of the first λ/2 resonator and one end of second λ/2 resonator for connecting the first and second λ/2 resonator, a control means for controlling the switching means, and a detecting means coupled to the first and second λ/2 resonator for detecting the down-converted signal, wherein the control means is adapted to initiate in a down-conversion cycle the switching means to connect the first and second λ/2 resonator for approximate half of the RF carrier period of the modulated signal. With this pole switch down-converter adjacent RF channels can be selected and down-converted by slightly varying the pole switch repetition rate.

21 Claims, 27 Drawing Sheets

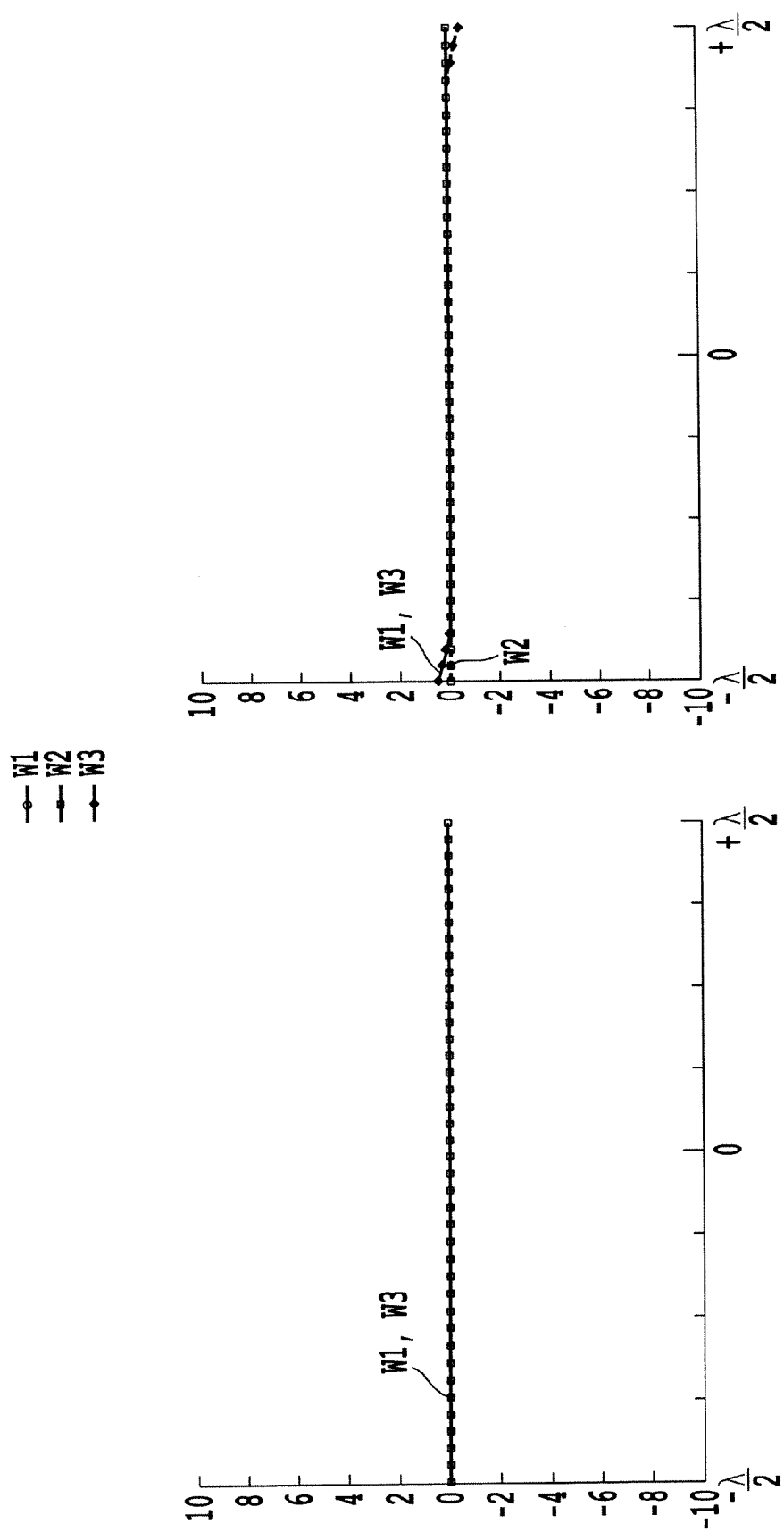

Figure 2E:
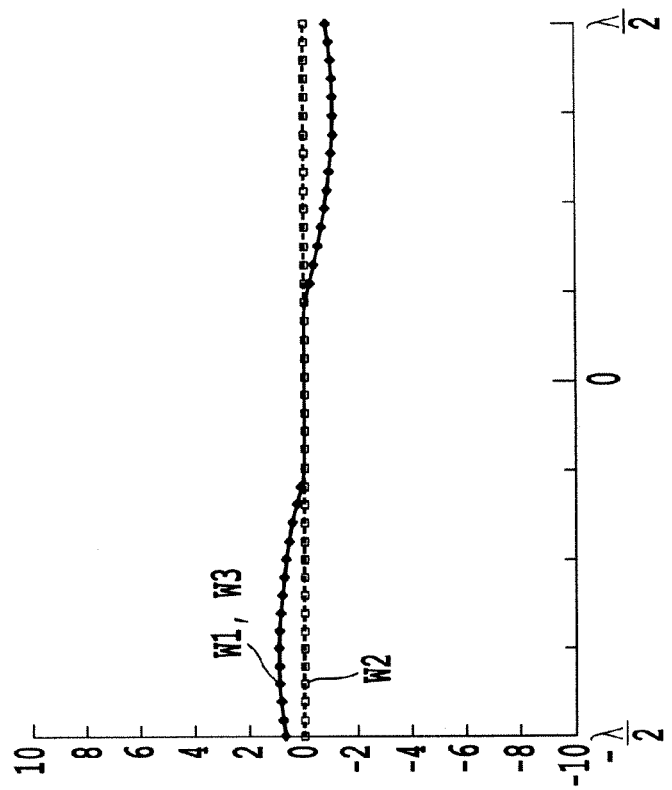
Figure 2F:
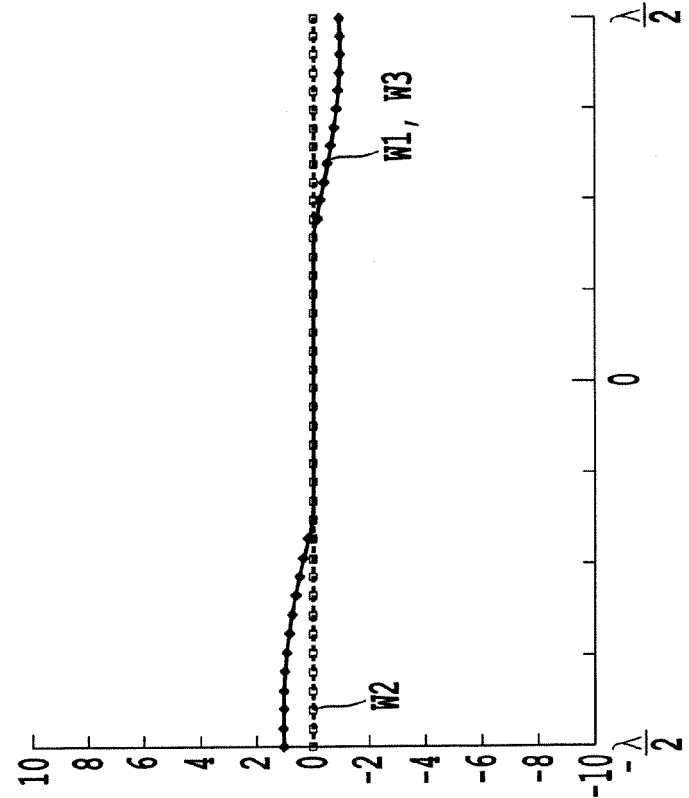
Figure 2J:
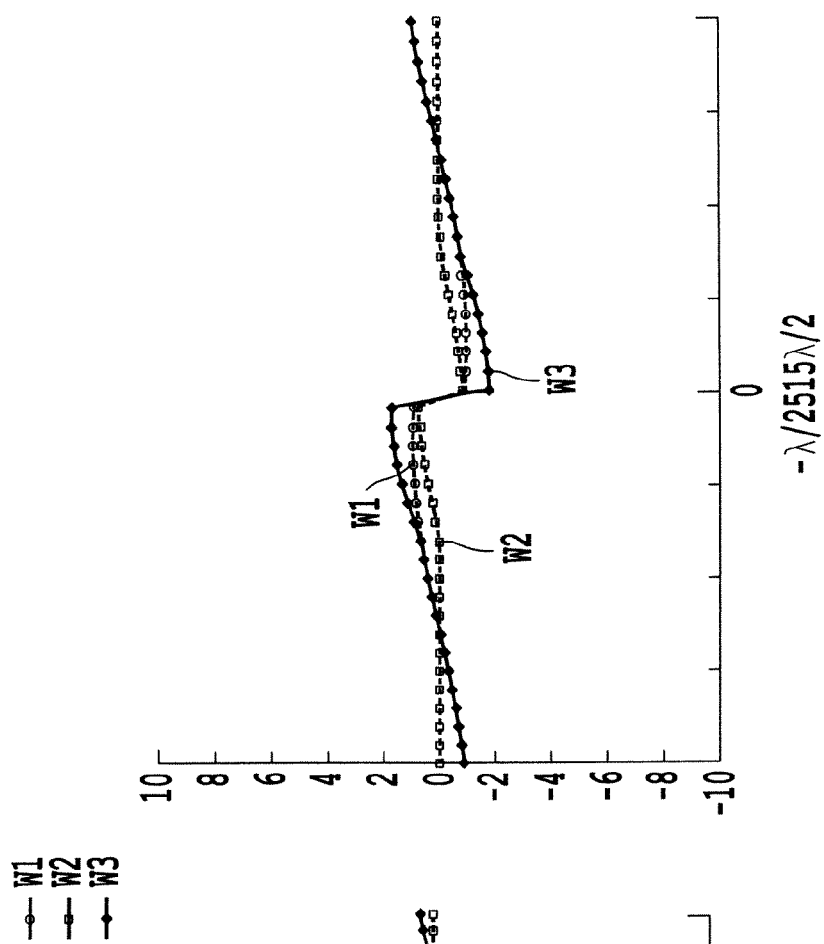
Figure 2I:
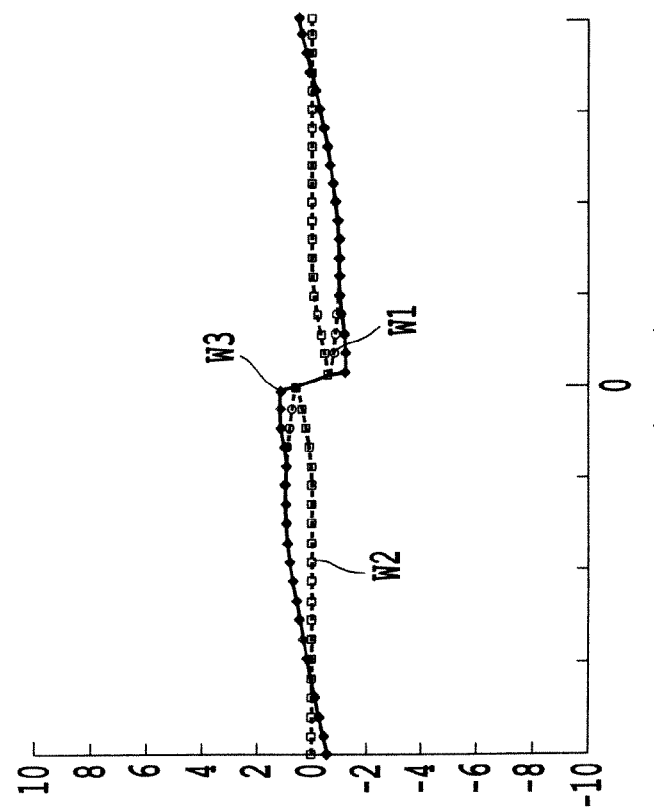
Figure 2L:
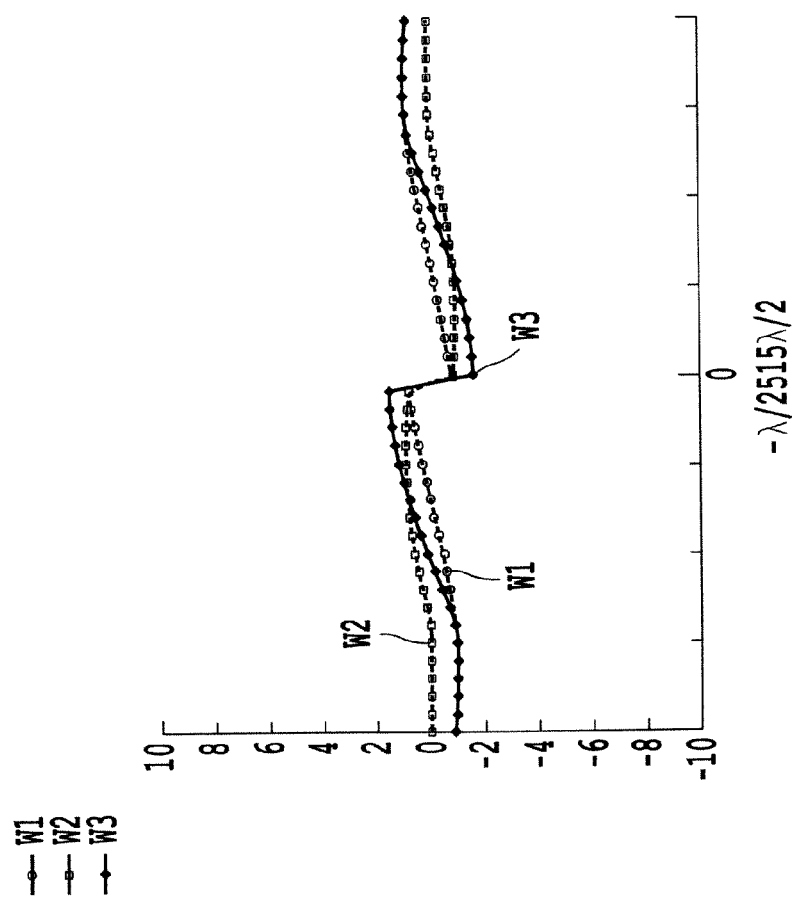
Figure 2K:
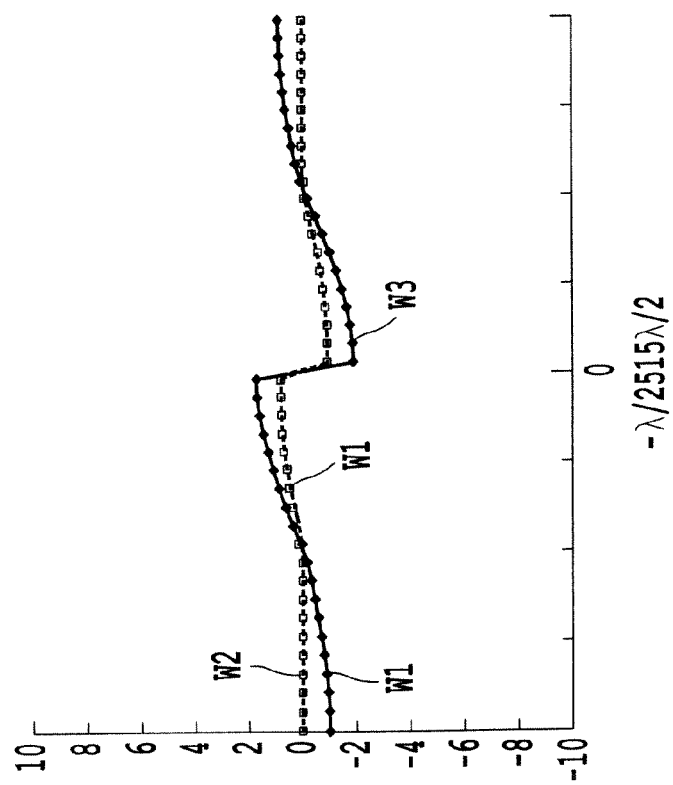
Figure 2N:
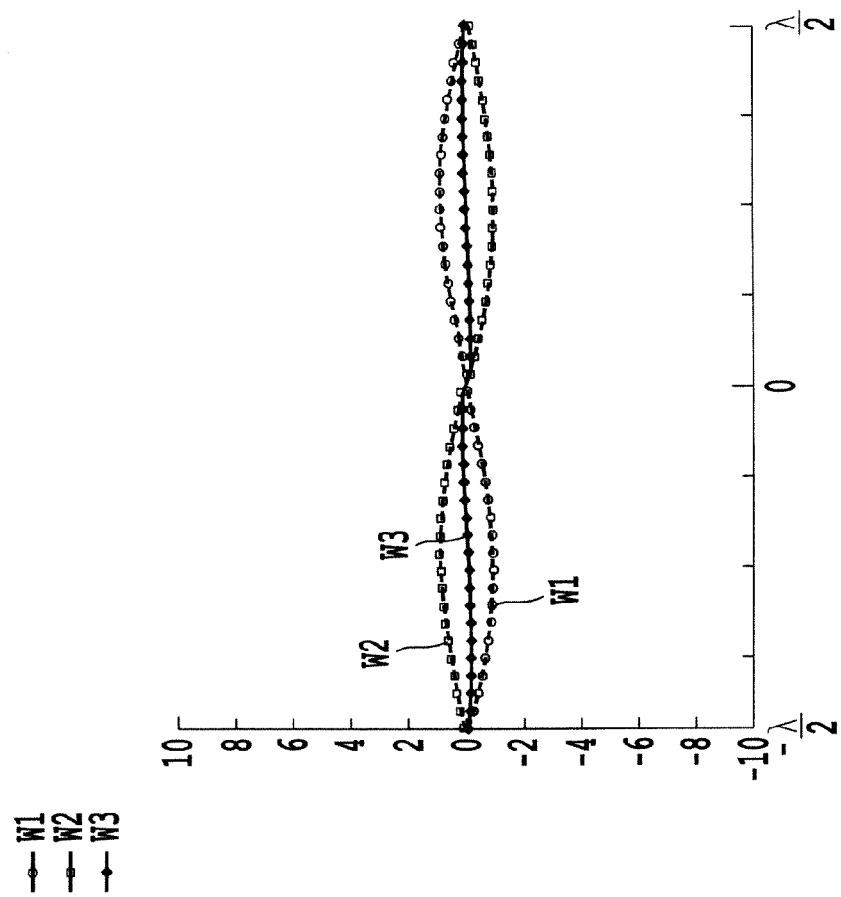
Figure 2M:
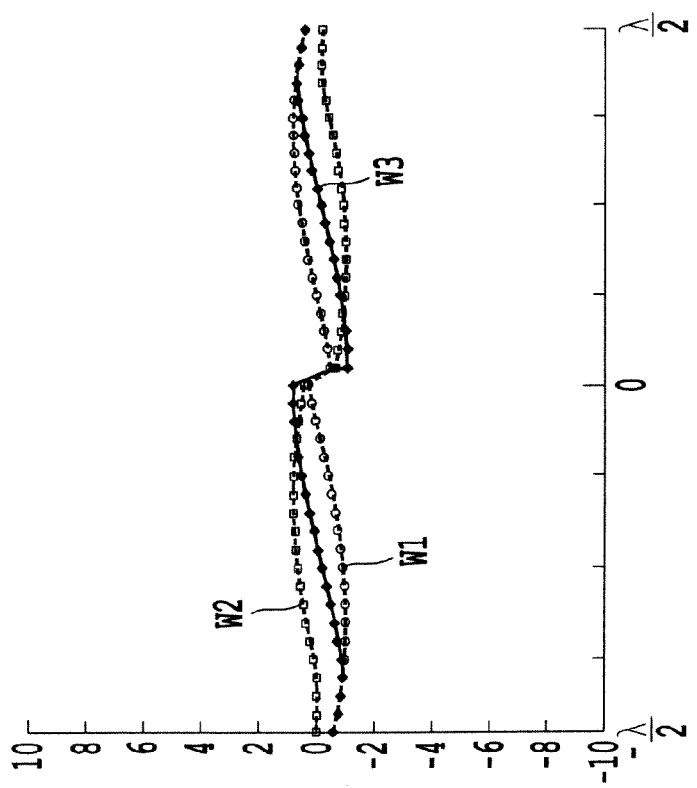
Figure 3B:
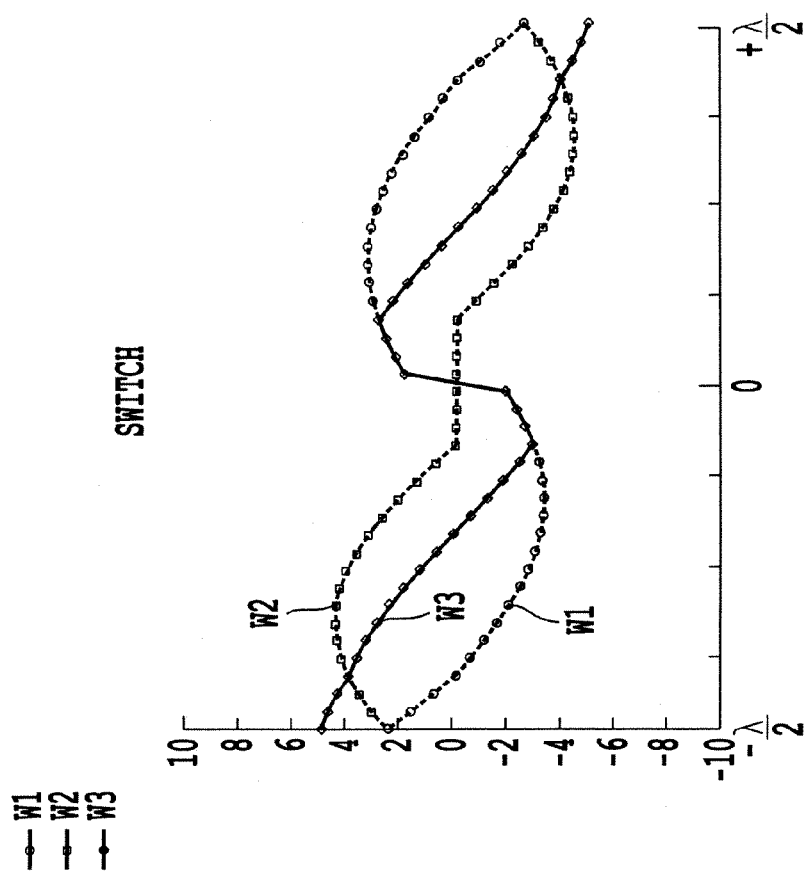
Figure 3A:
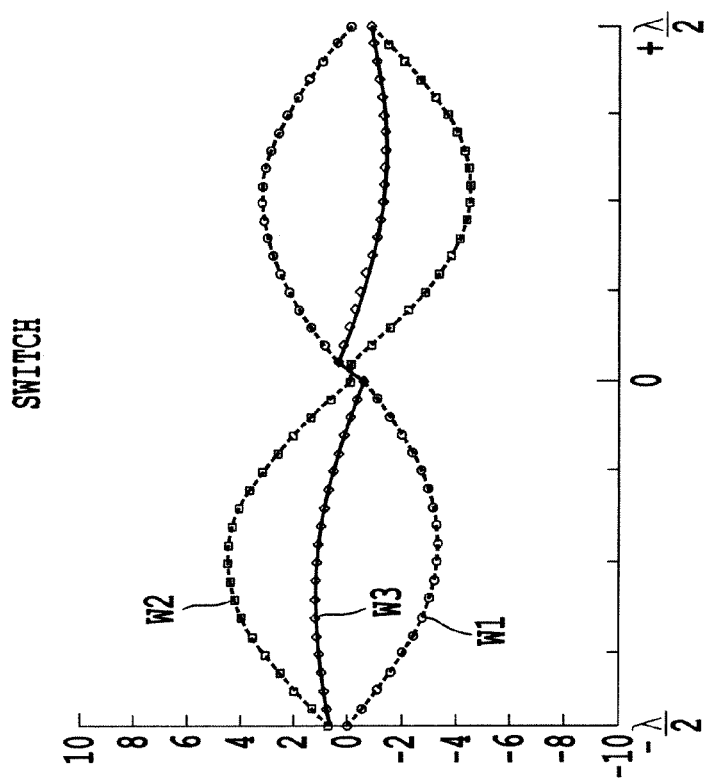
Figure 3D:
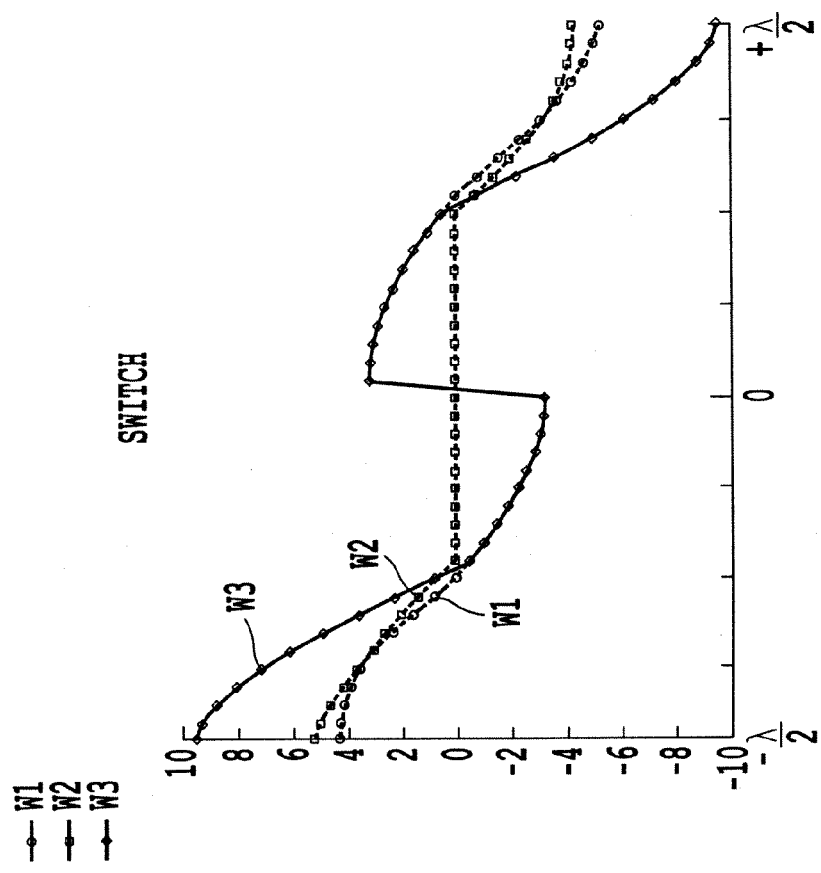
Figure 3C:
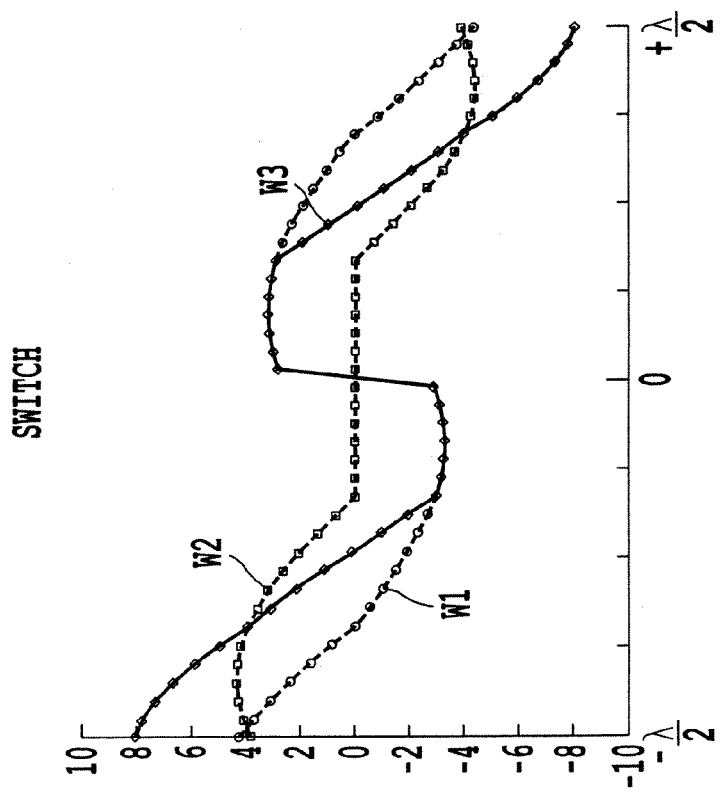
Figure 3F:
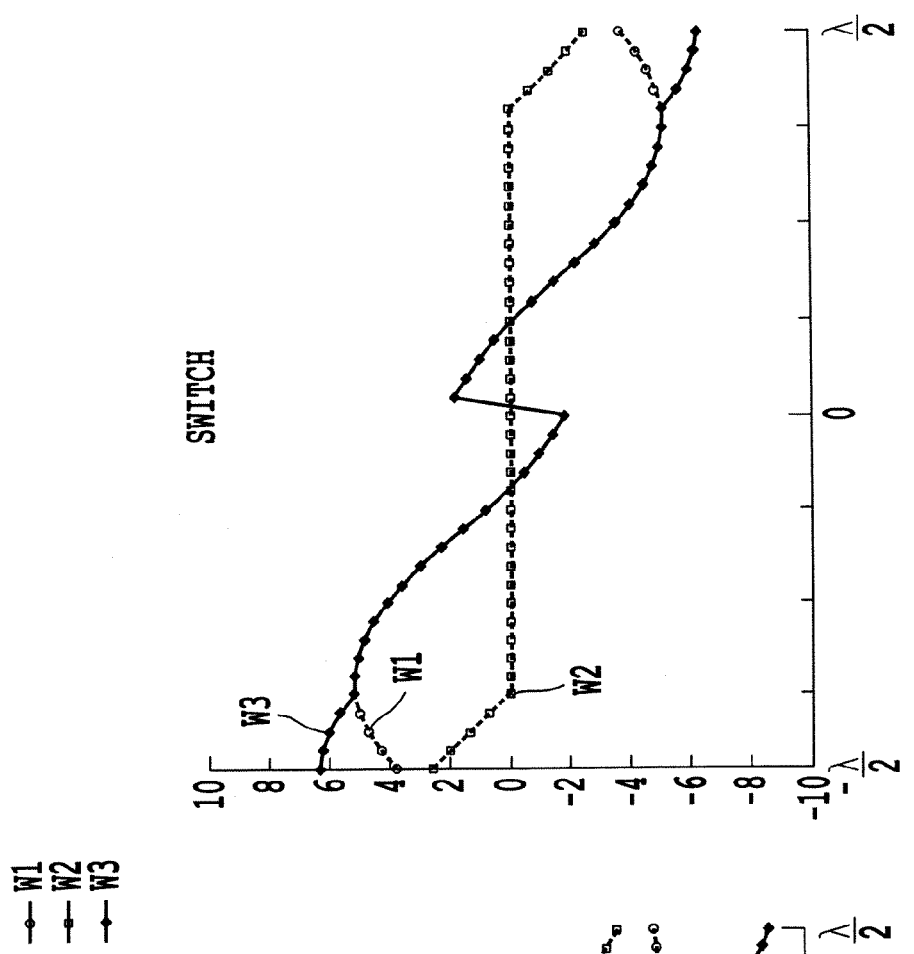
Figure 3E:
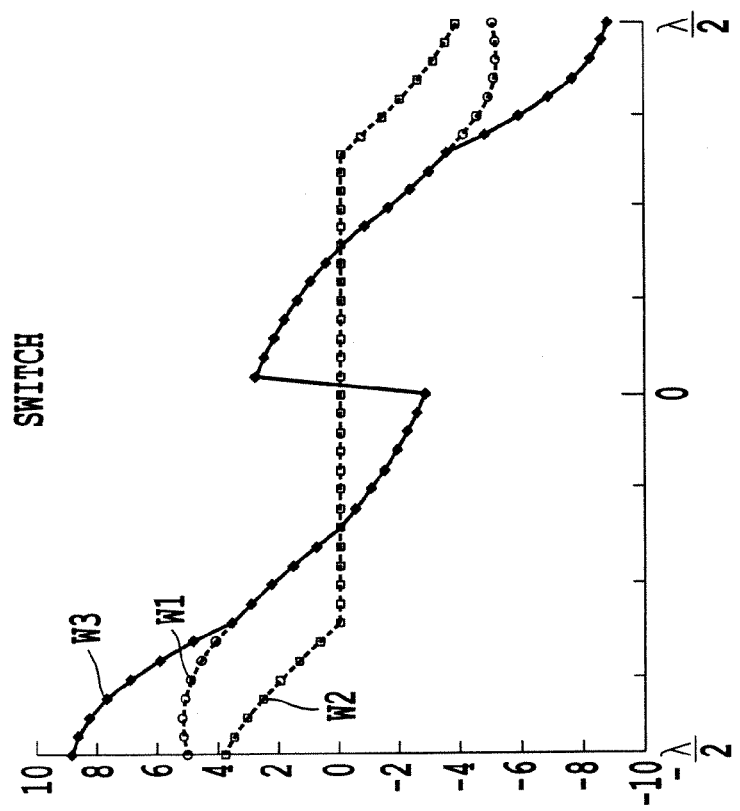
Figure 3G:
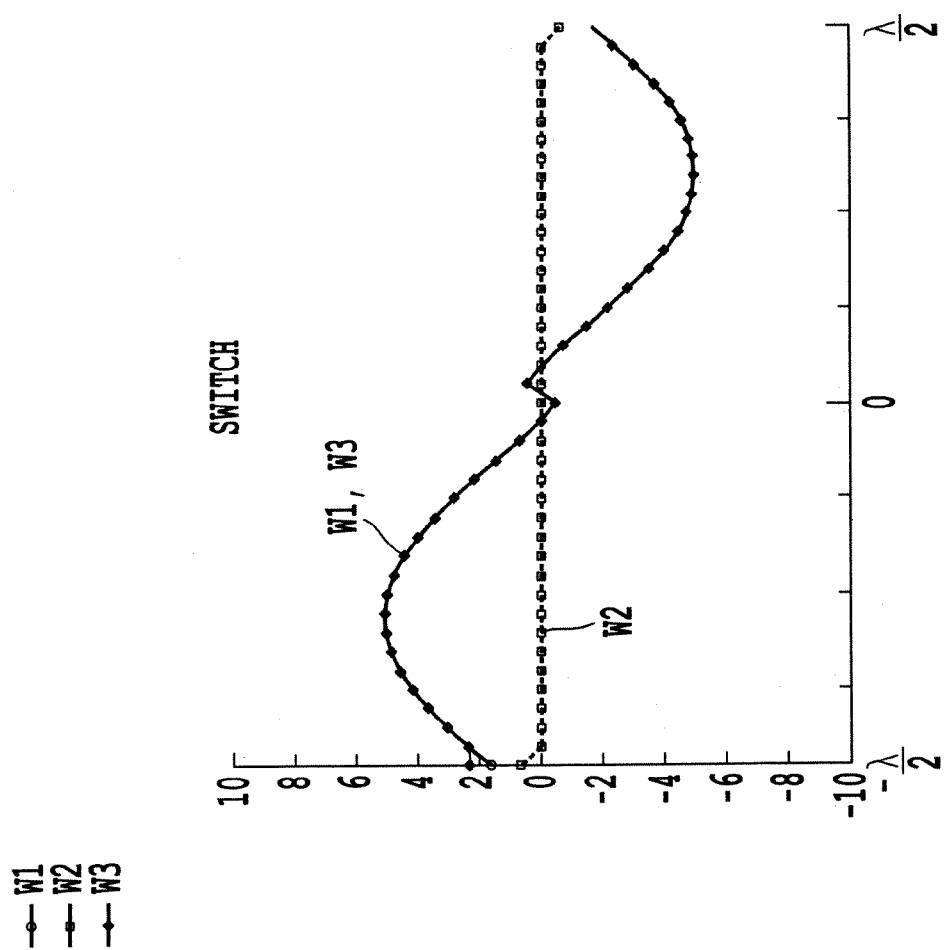

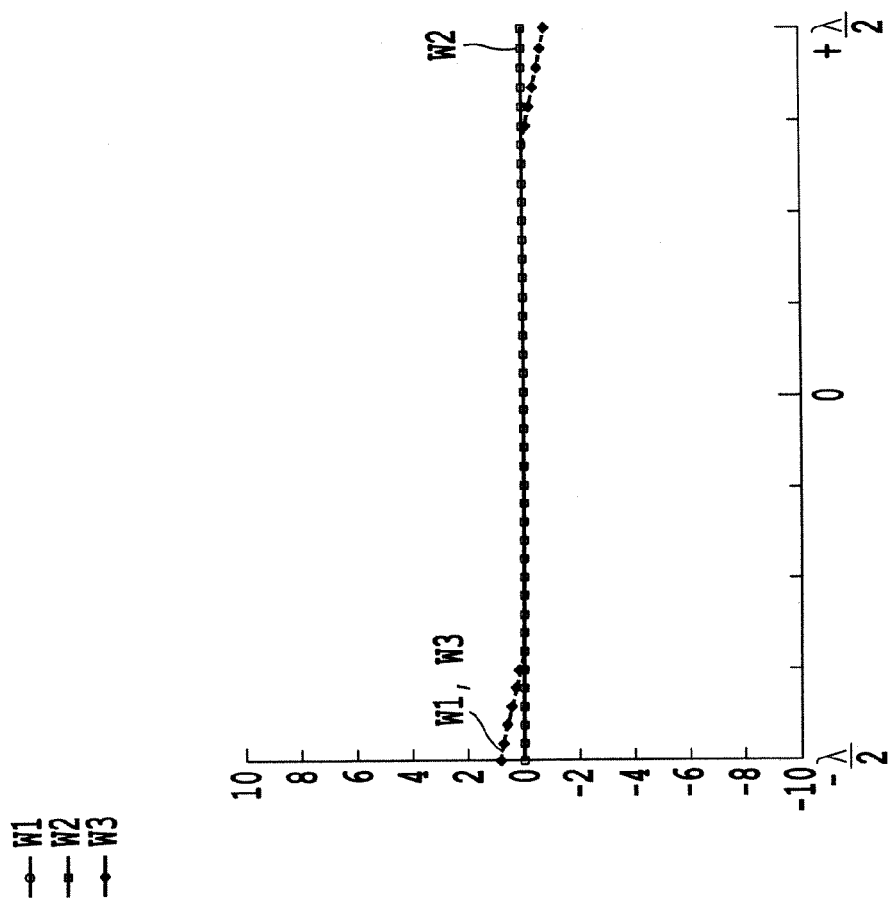
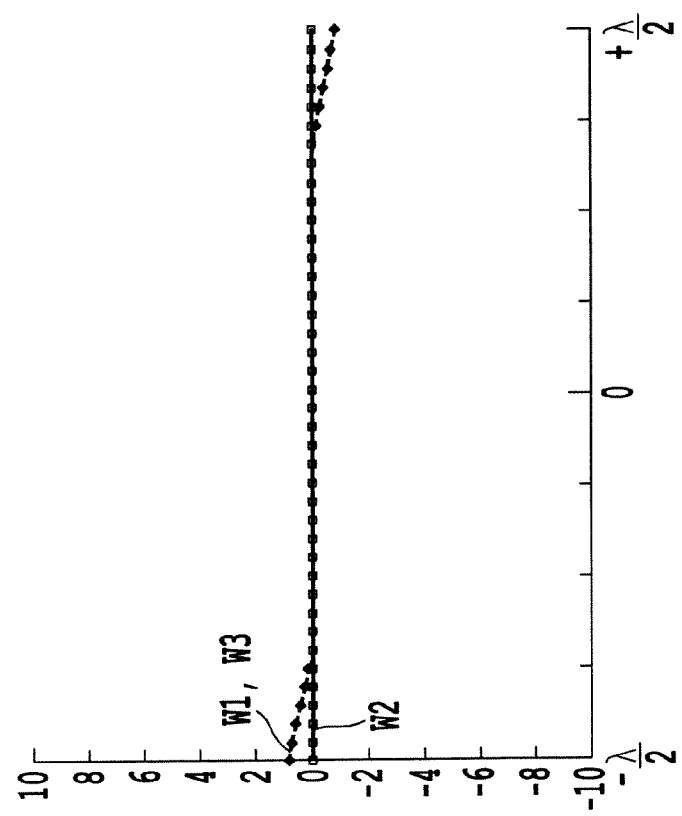
*Fig.2(c)*
*Fig.2(d)*

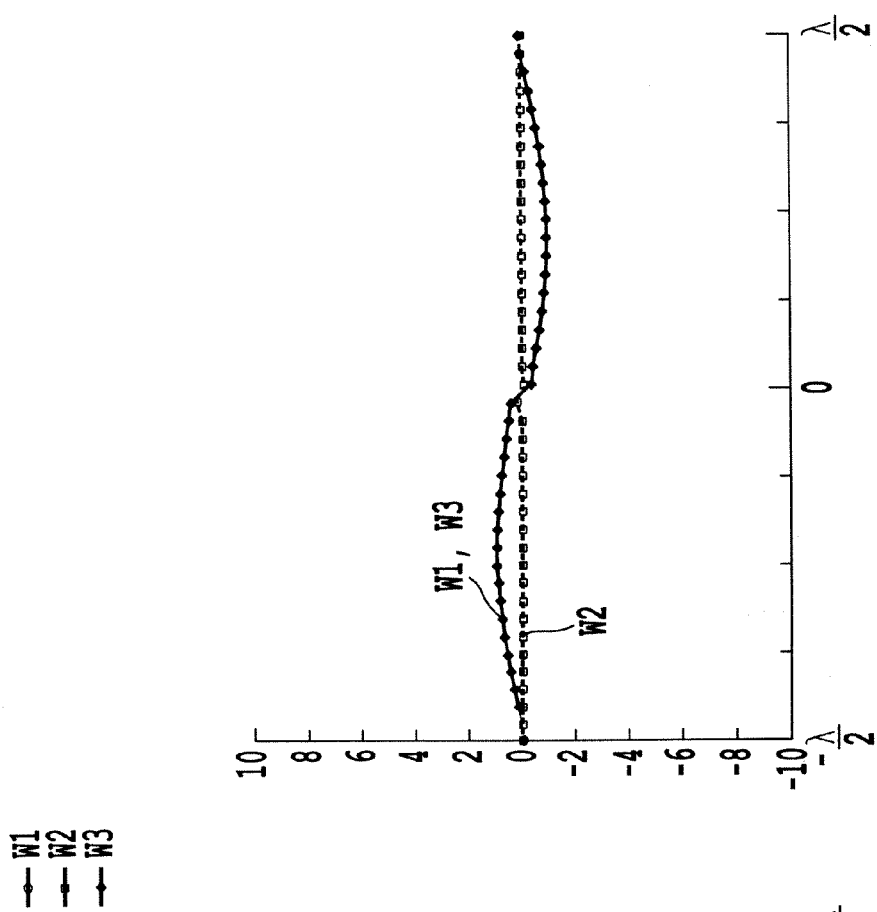
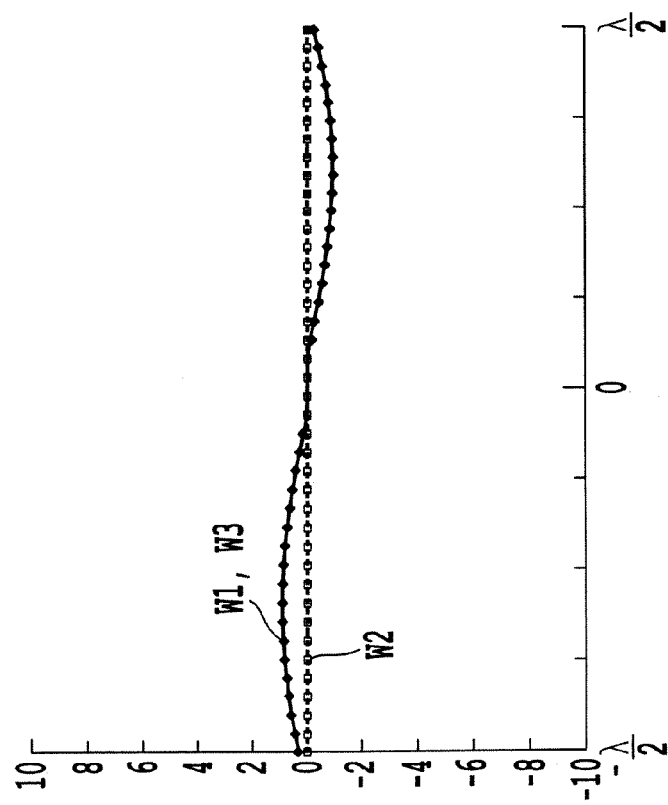
*Fig.2(g)*
*Fig.2(h)*

Figure 4B:
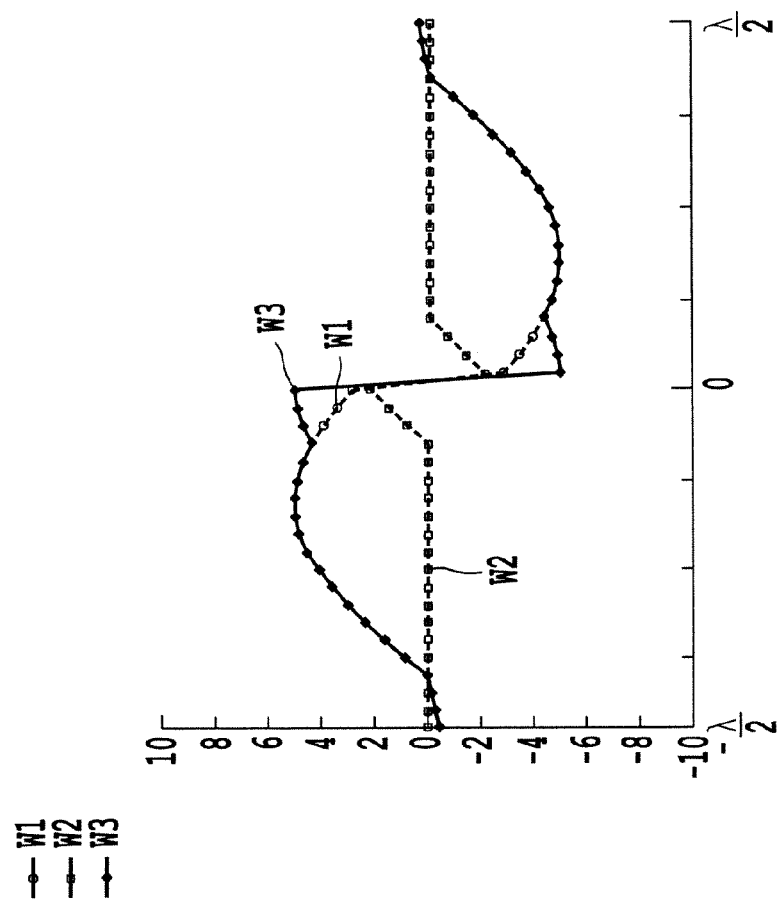
Figure 4A:
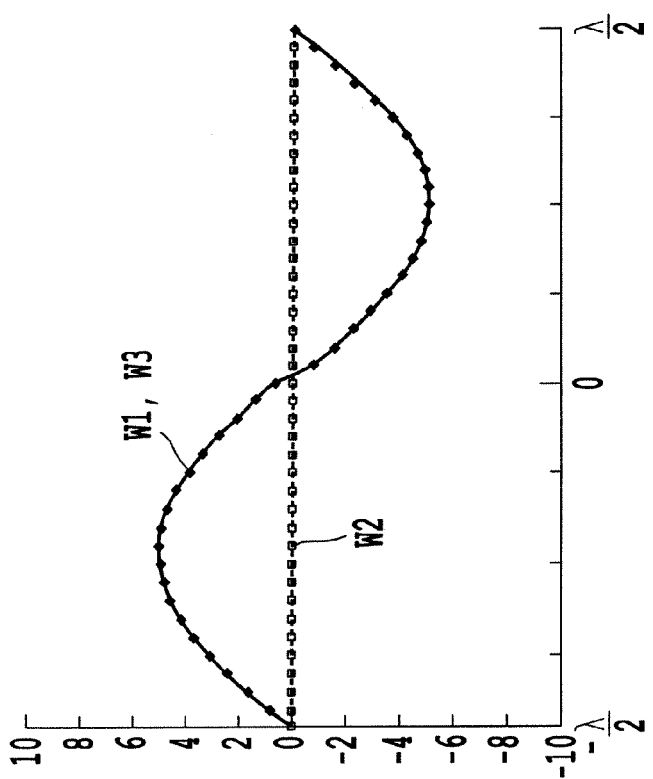
Figure 4D:
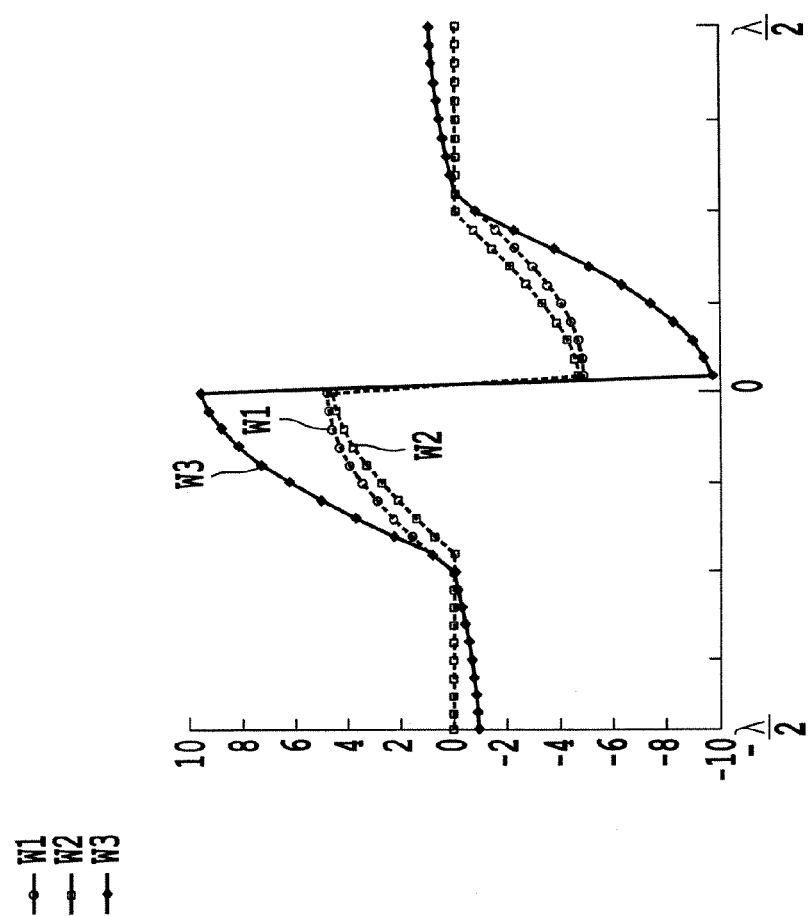
Figure 4C:
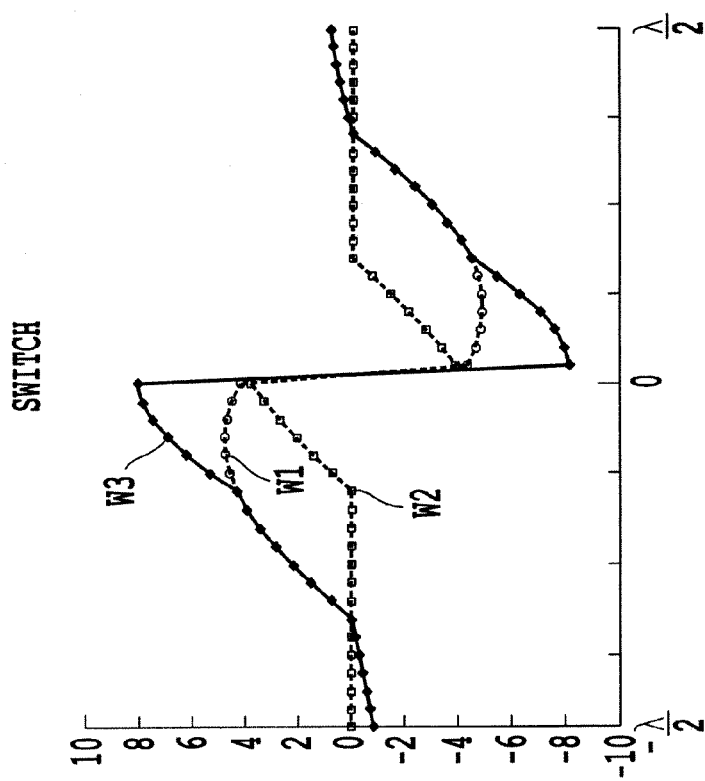
Figure 4F:
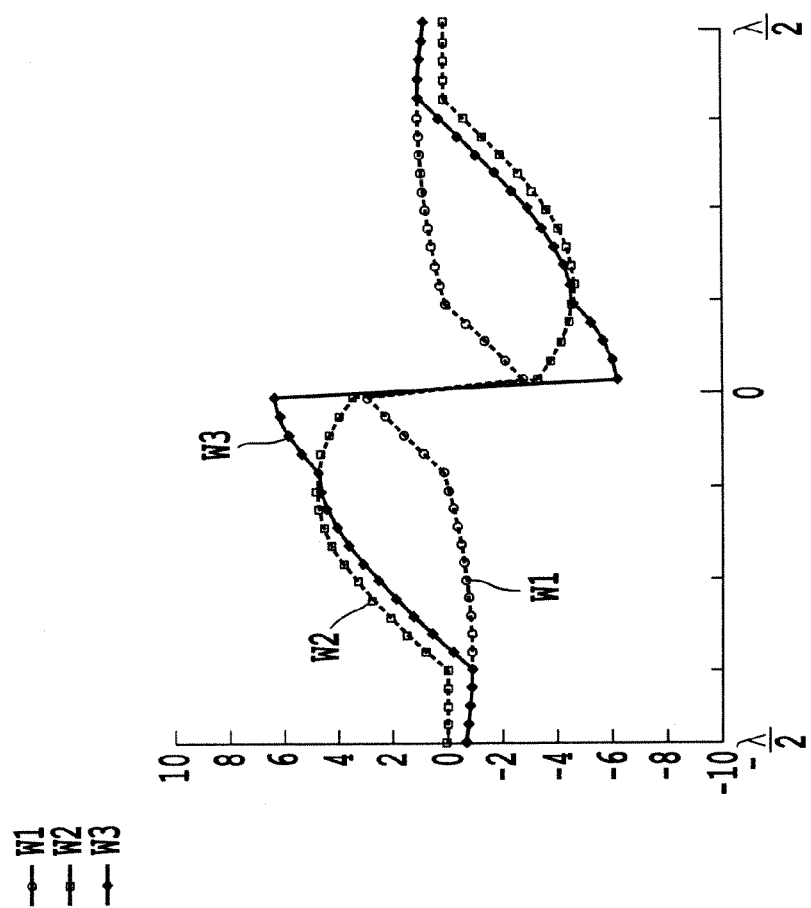
Figure 4E:
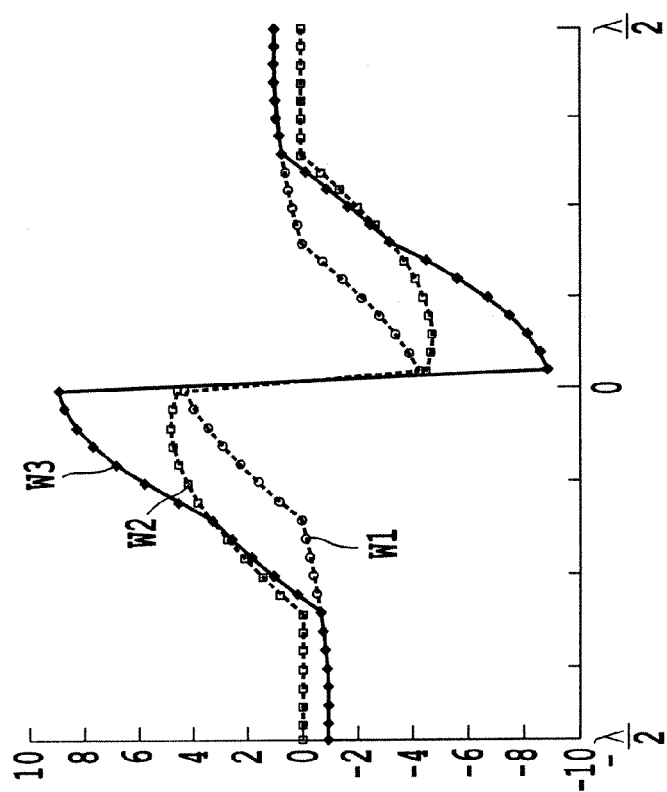
Figure 4H:
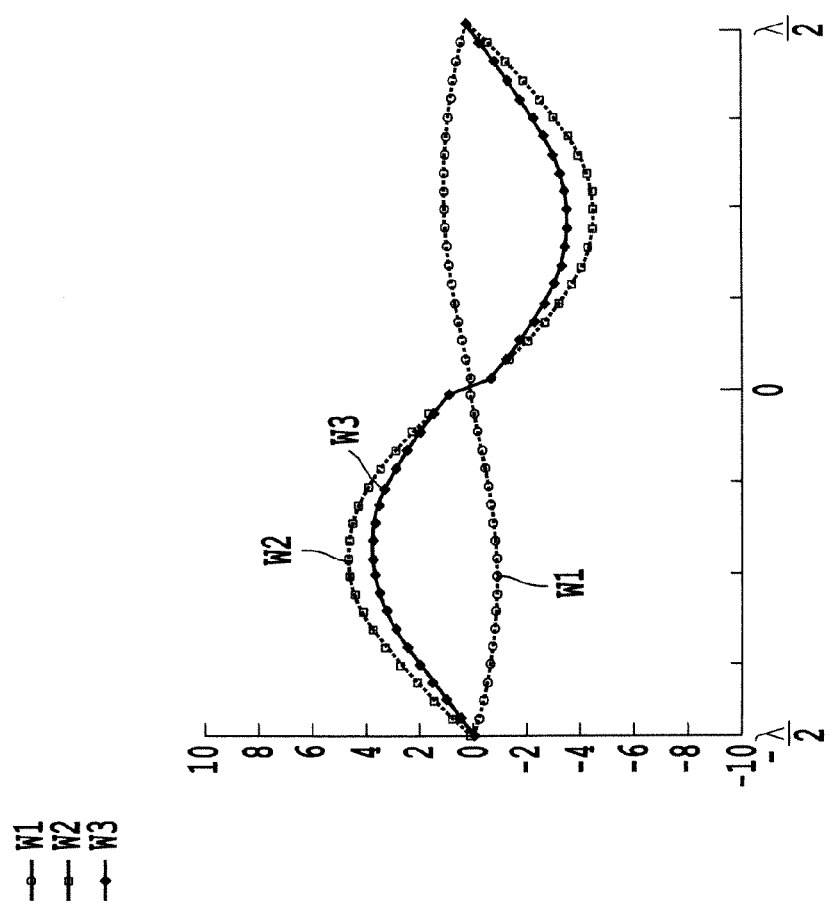
Figure 4G:
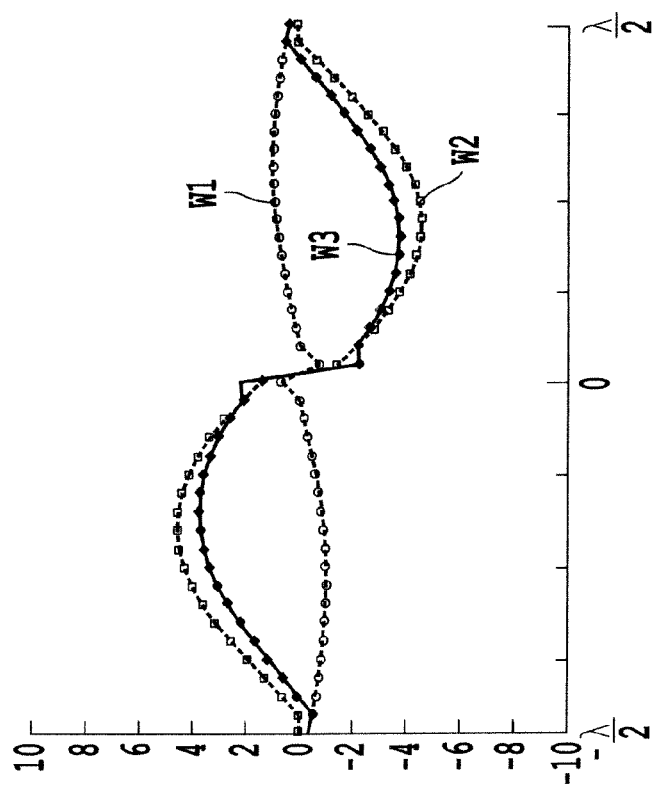
Figure 4J:
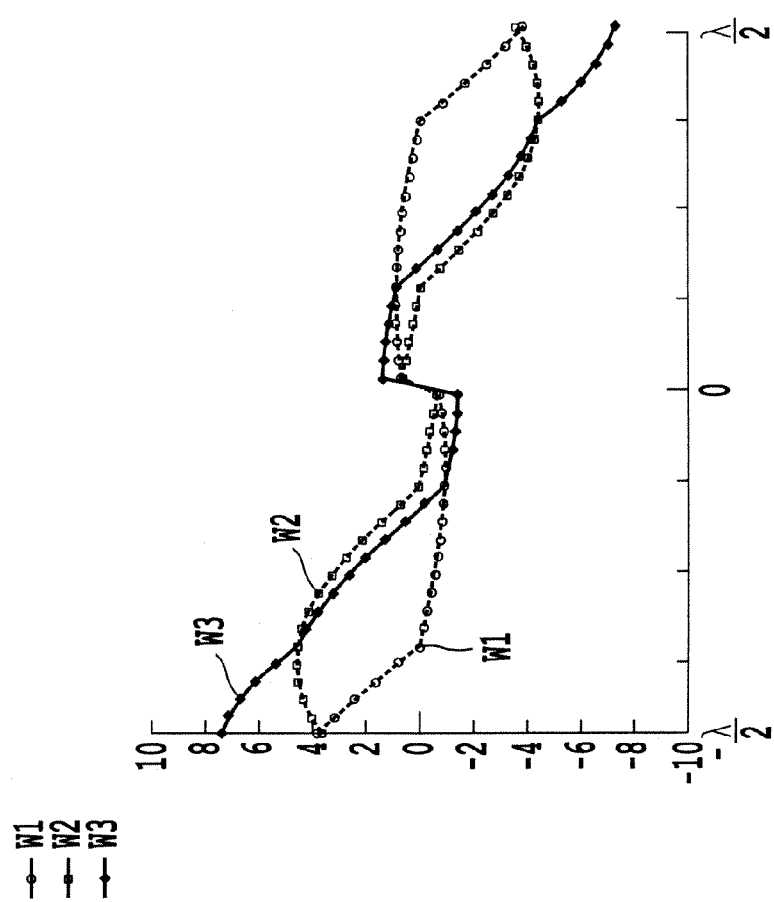
Figure 4I:
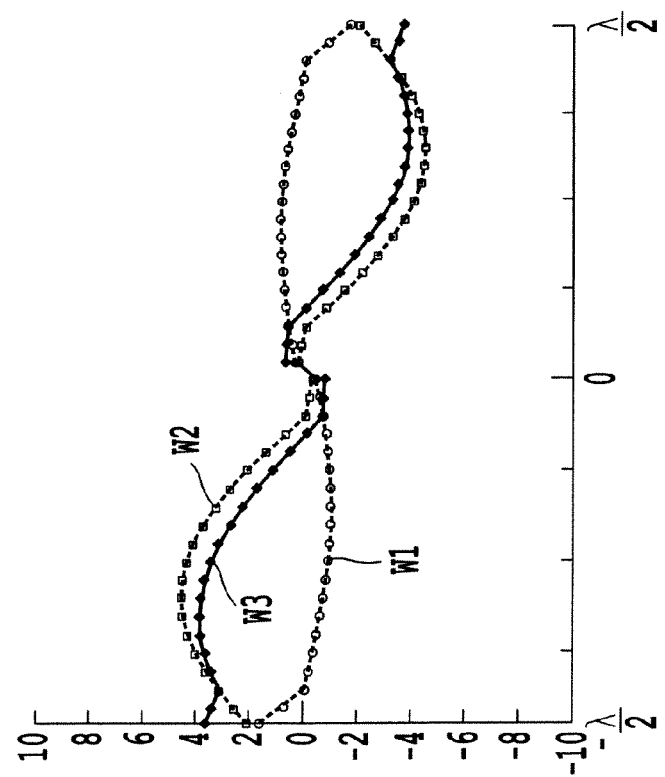
Figure 4N:
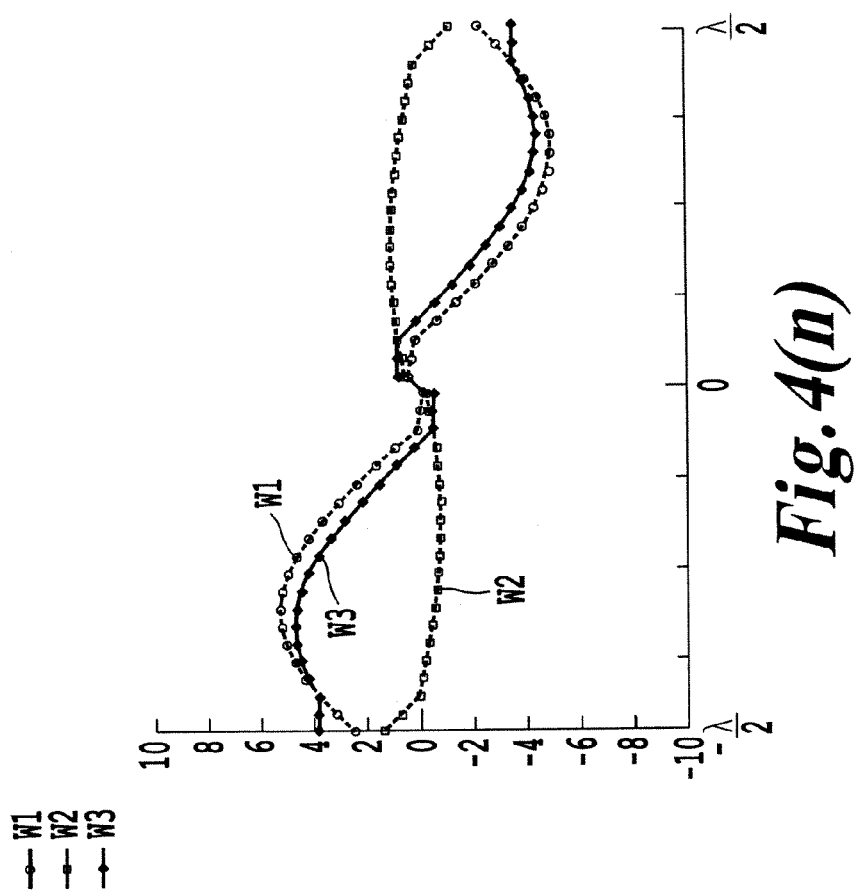
Figure 4M:
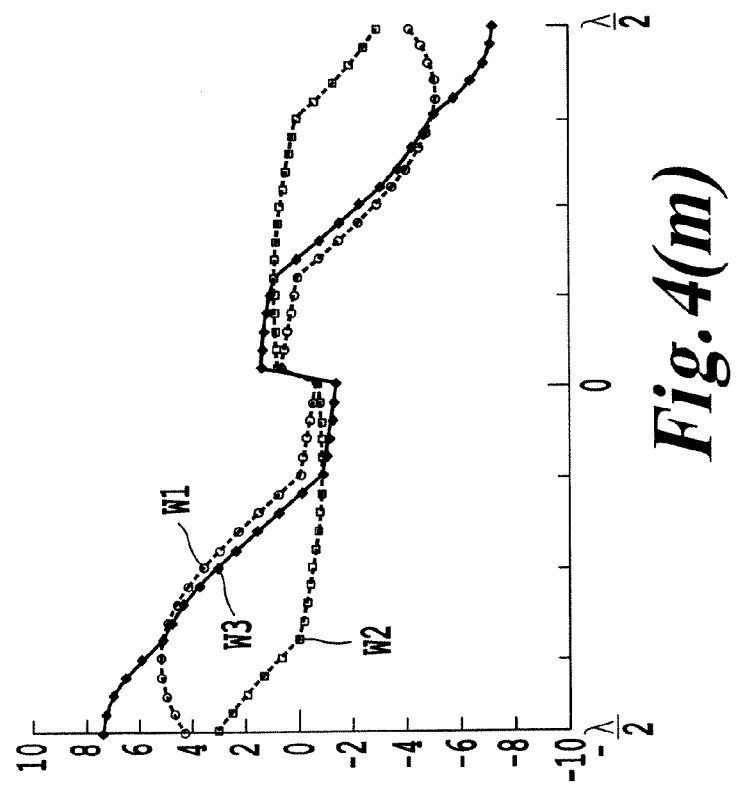
Figure 4O:
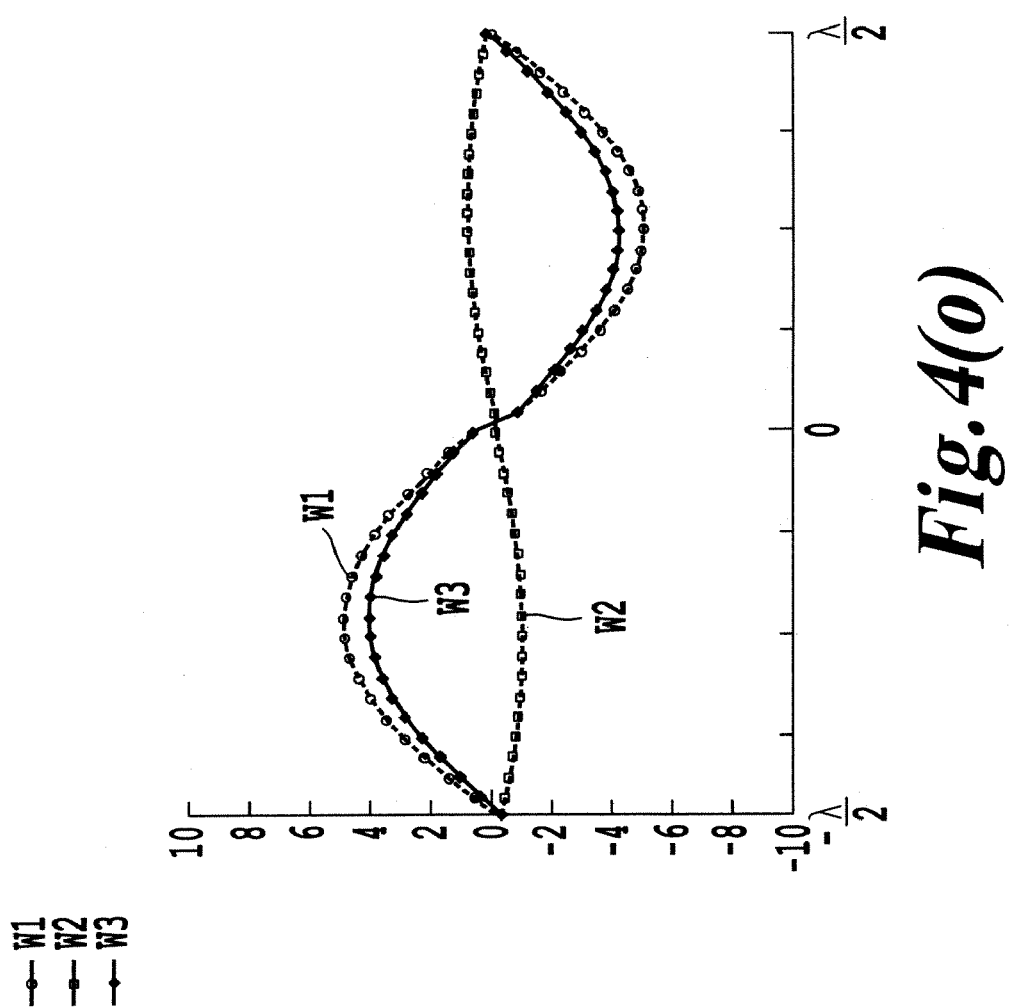

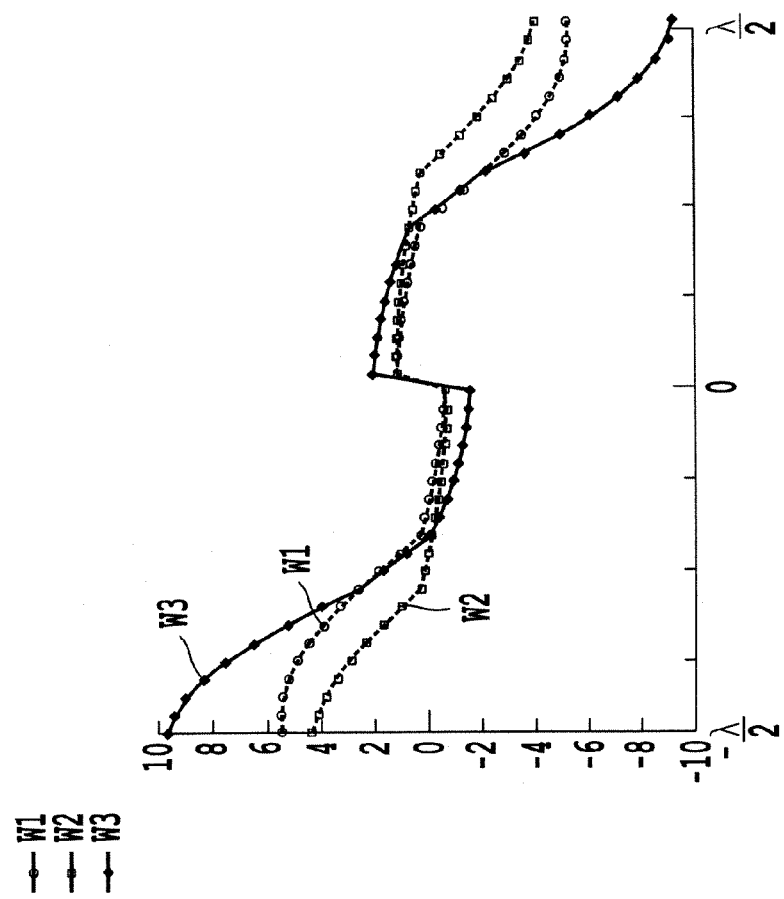
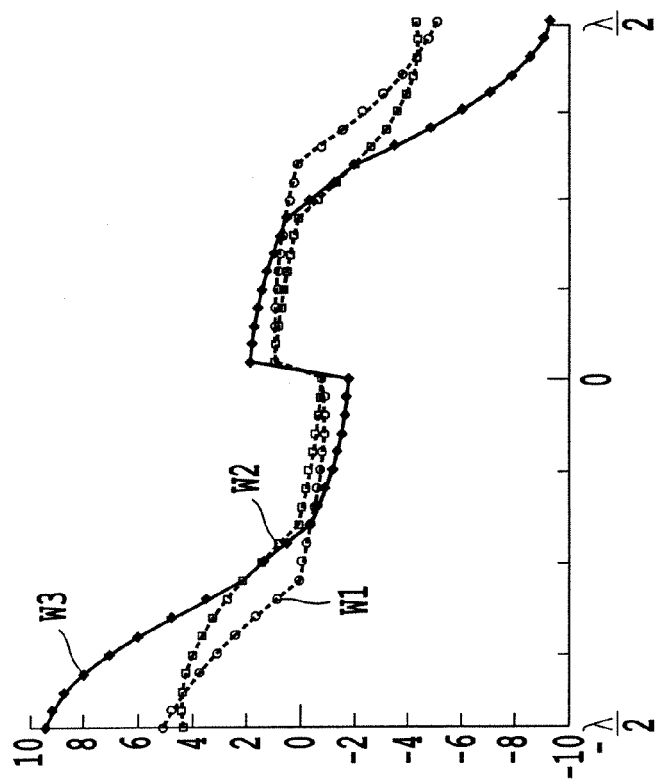
Fig. 4(l)
Fig. 4(k)

POLE SWITCH DOWN CONVERTER WITH SYMMETRIC RESONATOR

The present invention relates to a circuit and a method for down-converting a modulated signal, particularly RF (radio frequency) signals in a radio receiver.

Radio receivers are designed to receive modulated signals (e.g., amplitude modulated (AM), frequency modulated (FM), and 8-symbol phase shift keying (8-PSK) signals) centred at particular carrier frequencies. In typical broadcast systems, a broad band of carrier frequencies is divided into a number of adjacent channels, each centred at a unique carrier frequency, wherein the radio receiver is tuned to one of these channels.

Before the information modulated onto the signal is extracted, the received high frequency signal is down-converted to a lower frequency, or a baseband signal typically by means of mixers, which mix the signal received by an antenna with a signal oscillating at the same carrier frequency.

Receivers that convert the received RF signal in one step to the baseband signal are called "homodyne" receivers, wherein "heterodyne" receivers convert the received RF signal in incremental steps. In the heterodyne receiver, the RF signal is down-converted into one or more intermediate frequency (IF) signals, which are centred at respective frequencies lying somewhere in between those of the RF signal and the baseband signal.

In automotive garage door openers, portable telephones, remote meter reading systems, and the like, superregenerative receivers are widely used because of their small size, ease and economy of construction. A conventional superregenerative receiver includes an antenna, a superregenerative detector responsive to a signal received at the antenna, a buffer amplifier for amplifying the received amplitude modulated (AM) signal, a quench oscillator and a low-pass filter.

The oscillator is automatically switched between an oscillating state and a non-oscillating state at a lower rate than the radio frequency. The switching frequency is referred to as the "quenching frequency". The signal voltage to be detected is connected to a feedback loop which is connected to a transistor amplifier to cause oscillation.

In the absence of an applied voltage, the oscillation that builds up during each cycle of the quench voltage starts with an initial amplitude determined by the noise voltages in the input circuit and reaches a final value corresponding to the equilibrium value for the oscillation. These oscillations then fade as the quench voltage prevents oscillating conditions.

A pole switch down-converter which down-converts phase and frequency modulated signals by periodically changing the oscillator pole locations is known from Hernandez, L., Paton, S., "A Superregenerative Receiver for Phase and Frequency Modulated Carriers", IEEE 2002, pages III-81 to III-84. In this pole switch down-converter, a delay element, such as a transmission line, and a means for changing the feedback polarity are inserted in the feedback loop, wherein, by changing the feedback polarity, the configuration in which the resonator collects RF energy is switched to the configuration in which the RF energy is down-converted. After the remaining energy in the resonator is suppressed the converter is switched back to the resonating mode for the next down-conversion cycle.

With this arrangement, a mixer circuit is employed for switching between an oscillating state and a non-oscillating state, whereby during the detection phase in which the RF energy is down-converted, no RF energy can be collected anymore. Therefore it is necessary to make this non resonating phase very short. However, a reduction of the detection phase would require a very fast and therefore very high power consuming detector circuit. Further, the mixer circuit contains several transistors which increase the circuit size, power consumption and introduced noise. Thus, it is desired to minimise the number of transistors in the down-conversion circuit and to avoid a mixer for switching the pole configuration in order to reduce circuit size, power consumption and introduced noise. Furthermore, it is desired improve the relationship of the RF energy collection phase and the non resonating phase.

It is therefore an object of the present invention to provide a circuit and a method for down-converting a modulated signal which reduce the non resonating phase.

This object is achieved by a circuit and a method for down-converting a modulated signal according to the enclosed independent claims. Advantageous embodiments of the present invention are the subject of the respective sub-claims.

According the present invention, a circuit for down-converting a modulated signal comprises a first and second $\lambda/2$ resonator for collecting RF energy, wherein a differential RF signal is coupled to the first and second $\lambda/2$ resonator, a switching means coupled at one end of the first $\lambda/2$ resonator and one end of second $\lambda/2$ resonator for connecting the first and second $\lambda/2$ resonator, a control means for controlling the switching means, wherein the control means initiates the switching means to connect the first and second $\lambda/2$ resonator for approximate half of the RF carrier period of the modulated signal, and a detecting means coupled to the first and second $\lambda/2$ resonator for detecting the down-converted signal.

A method for down-converting a modulated signal in accordance with the present invention comprises the steps of providing a first and second $\lambda/2$ resonator for collecting RF energy, coupling a differential RF signal is to the first and second $\lambda/2$ resonator, connecting, after the first and second $\lambda/2$ resonator oscillate, the first and second $\lambda/2$ resonator for approximate half of the RF carrier period of the modulated signal, and detecting the down-converted signal.

With the present invention the non resonating phase is reduced to approximate half of the RF carrier period of the modulated signal, wherein the suppression phase can be omitted and the down-conversion circuit can be almost all the time in the resonator mode. It is further proposed to not detect the down-converted signal directly after switching to the non resonating mode but rather after switching back to the resonator mode. In this scheme the RF collection and the detection phase overlap. The down-conversion circuit according to the present invention allows to use only one switching element like a FET transistor, which can be controlled by a pulse source. The down-conversion circuit can be fabricated using standard CMOS processes. A mixer for switching the pole configuration can be avoided in order to reduce circuit size, power consumption and introduced noise. The symmetric structure of the $\lambda/2$ resonators allows to reduce the interference from the switching operation.

Further, with the present invention, adjacent RF channels can be selected by slightly varying the switch repetition rate so that the desired band is down-converted to a fixed intermediate frequency, wherein, with this arrangement, the down-conversion circuit has also the functionality of a band selection filter. In addition, a bandpass filter can be used to filter the intermediate frequency signal and suppress adjacent channels before further signal processing (e.g. amplifier, digital-to-analogue converter or IQ mixer). Thus, with the present invention no high frequency local oscillator is necessary for the down-conversion like in conventional mixer architectures.

Figure 1:
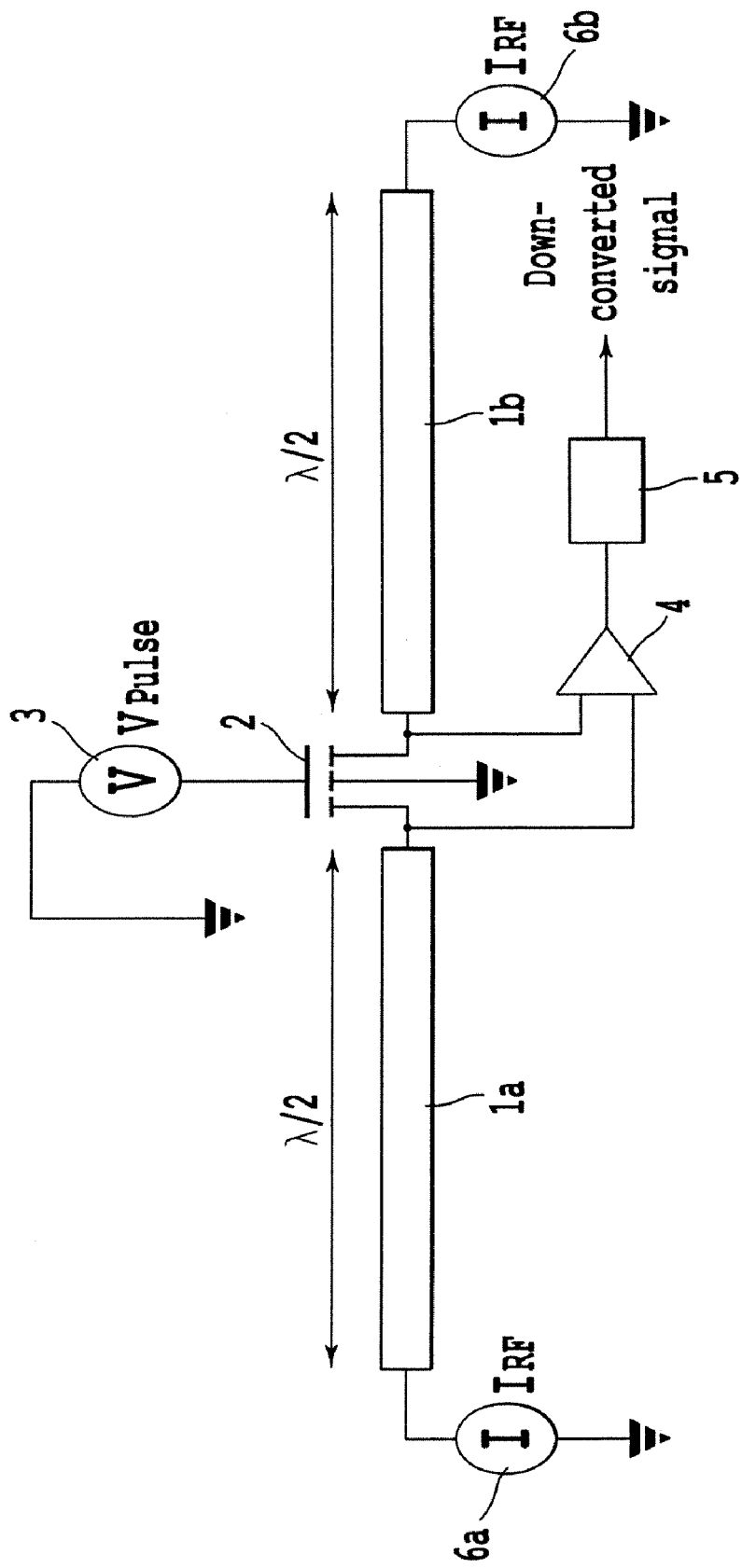
Figure 5:
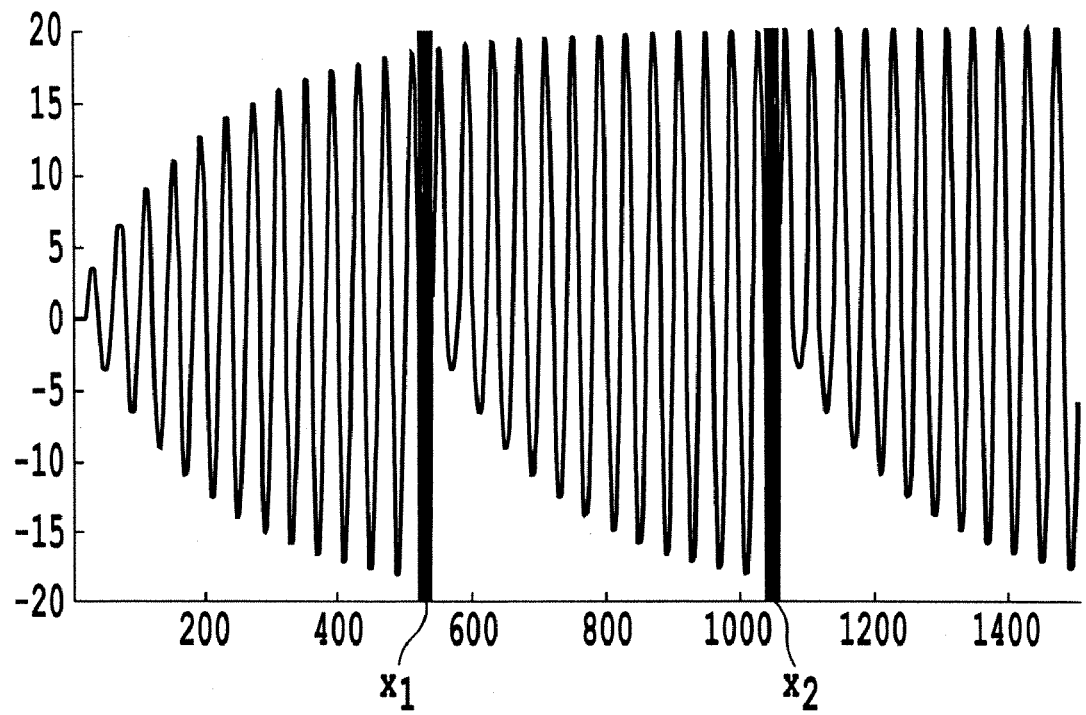
Figure 6:
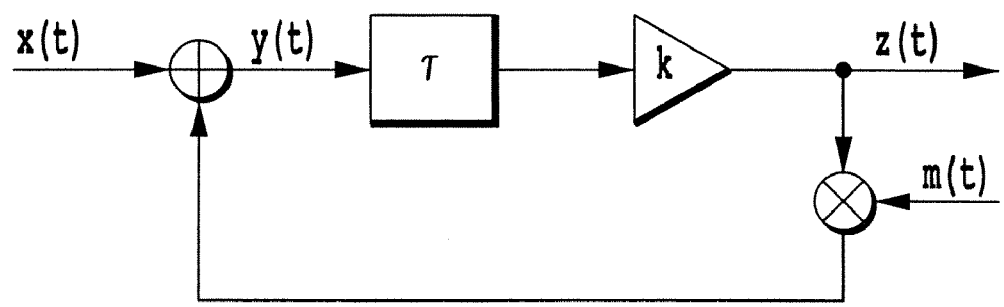
Figure 7:
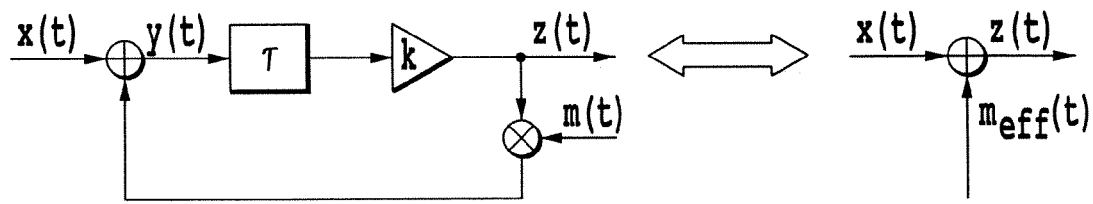
Figure 8:
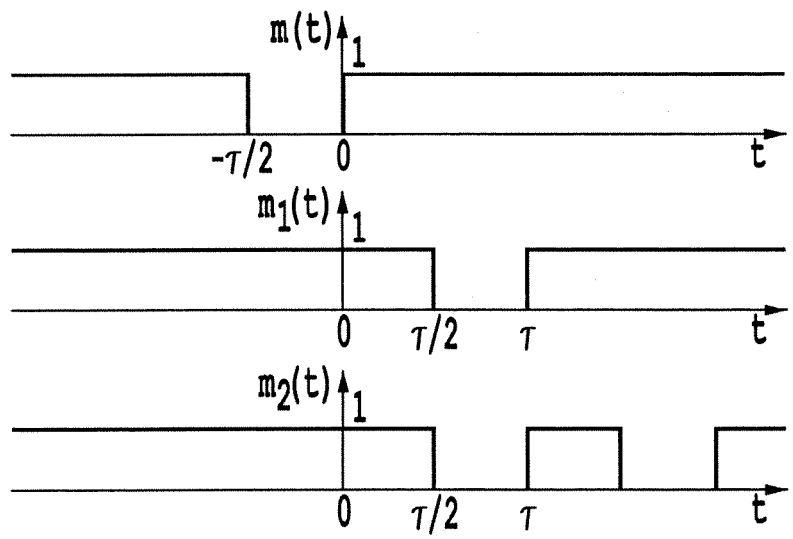
Figure 9:
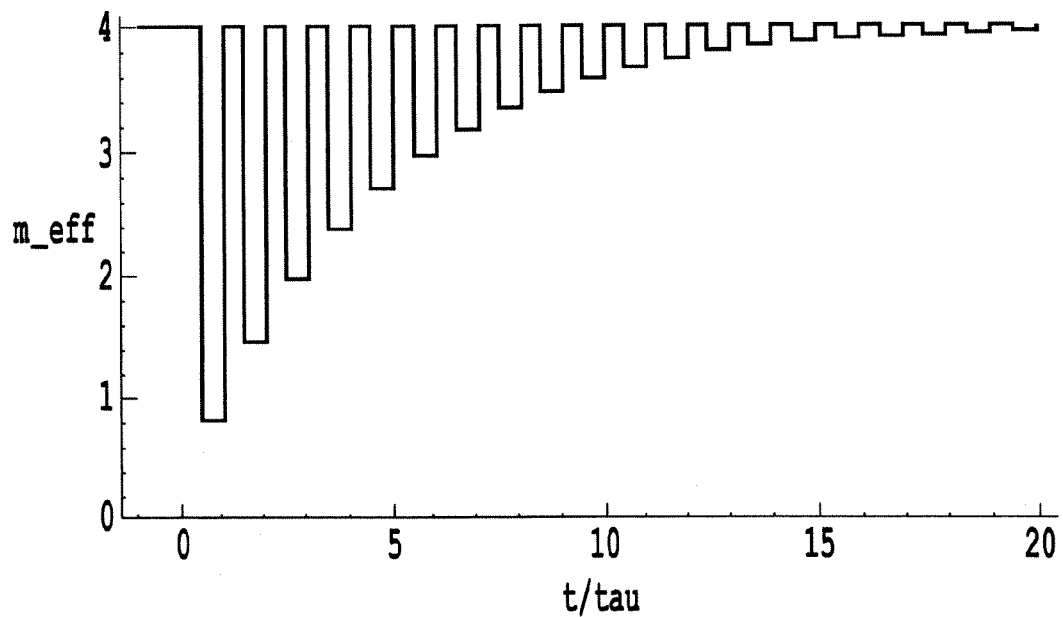
Figure 10:
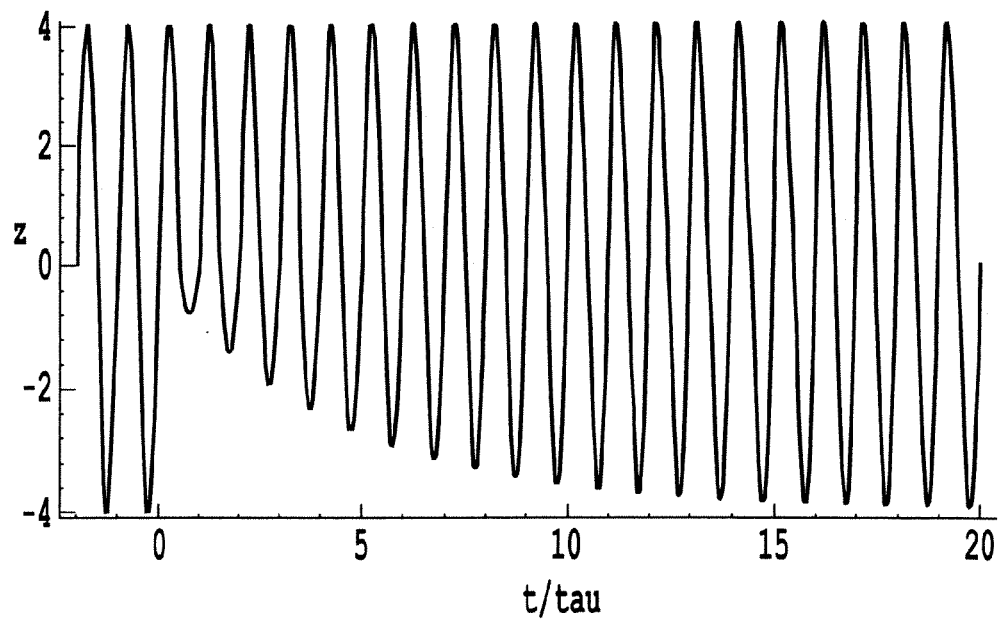
Figure 11:
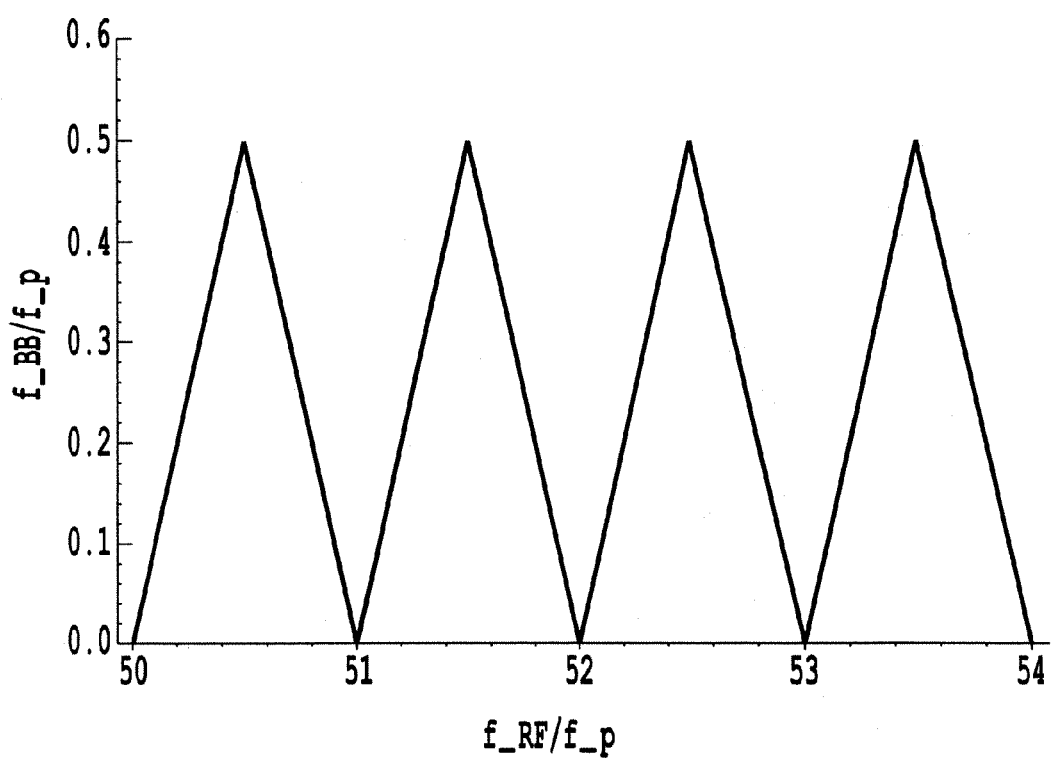
Figure 12:
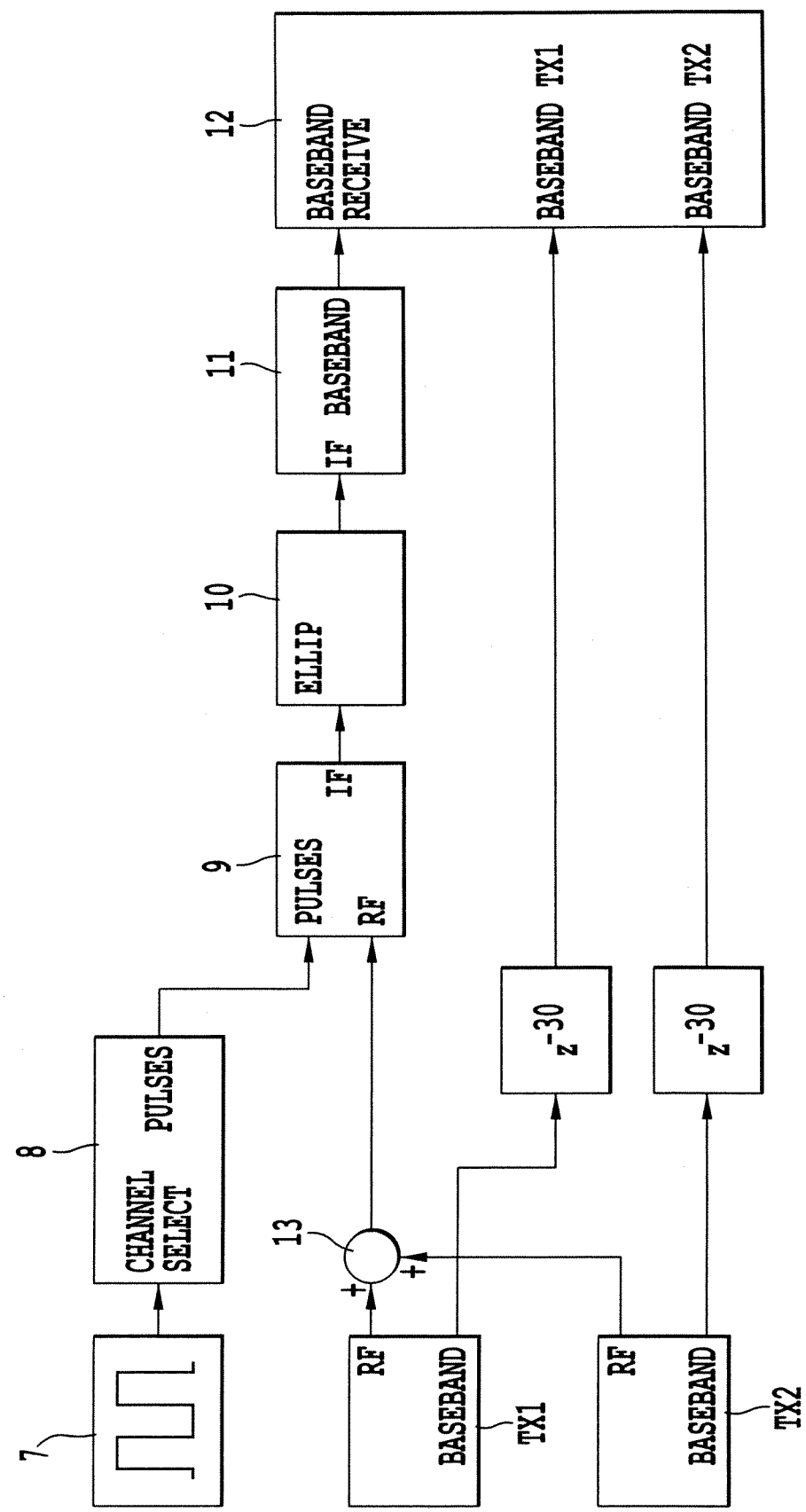
Figure 13:
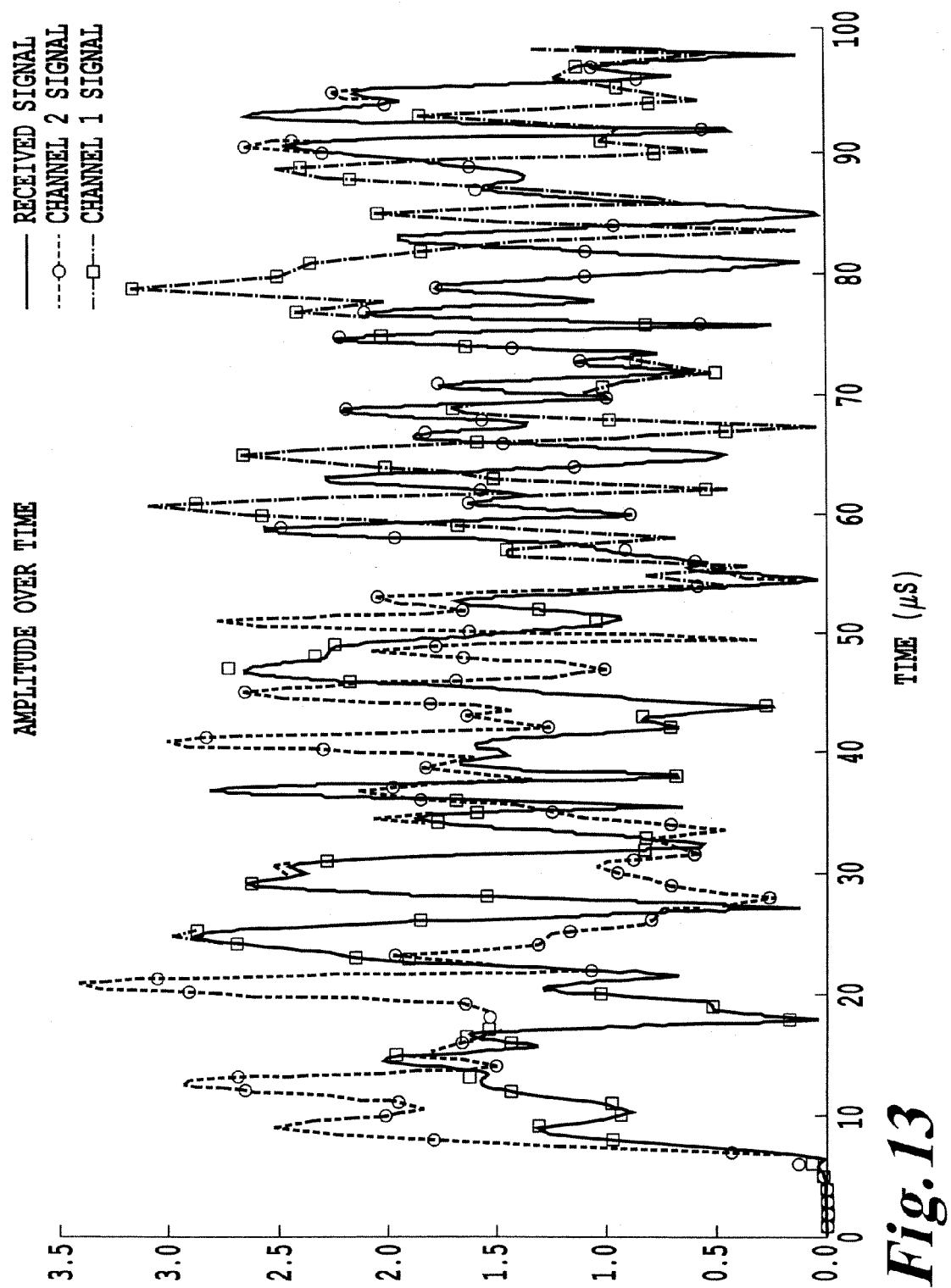
Figure 14:
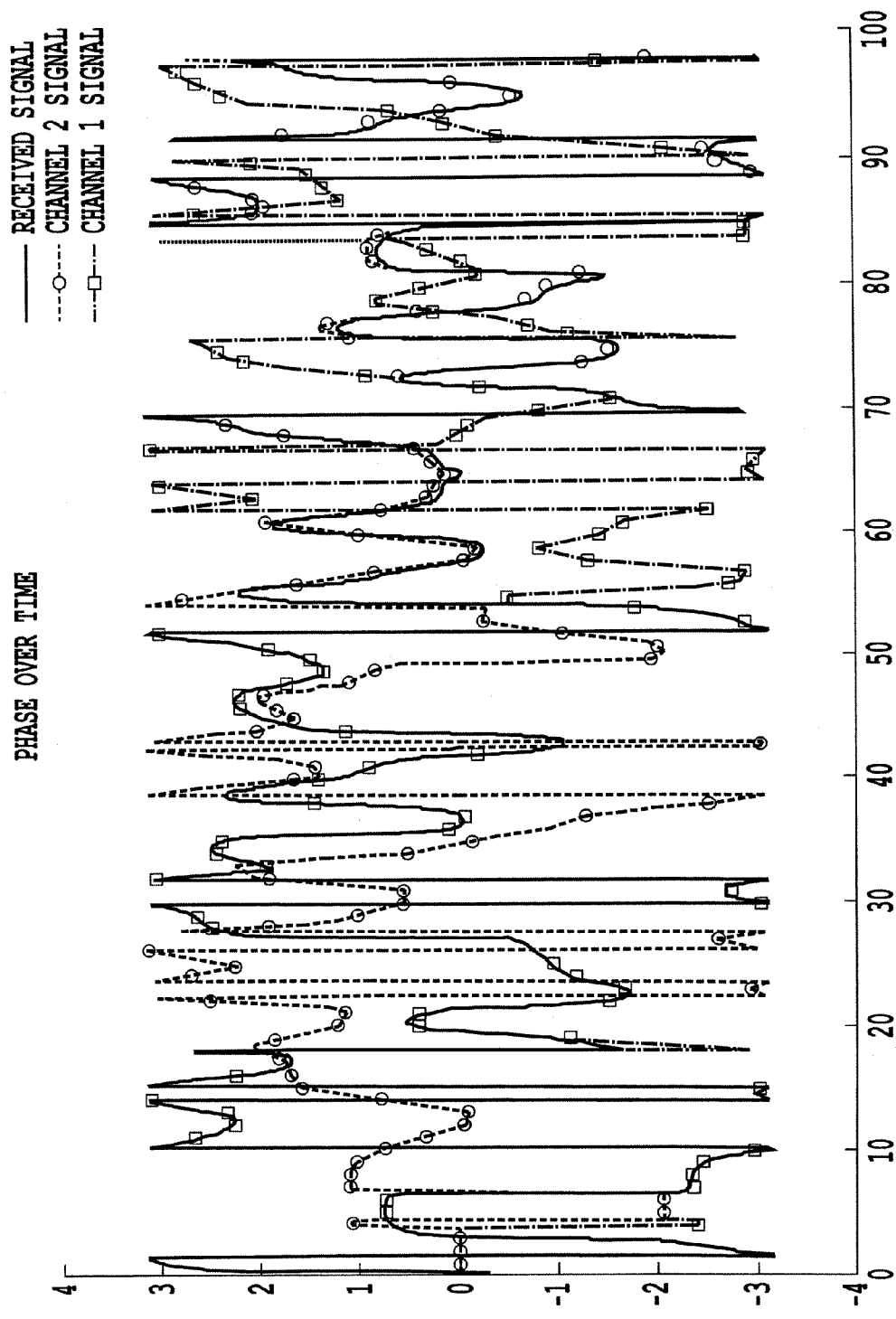

In the following description, the present invention is explained in more detail with respect to special embodiments and in relation to the enclosed drawings, in which FIG. 1 shows a block diagram of a down-conversion circuit according to the present invention, FIG. 2 shows the waves in the resonators of down-conversion circuit shown in FIG. 1 at various times after applying the RF sources, FIG. 3 shows the waves in the resonators of down-conversion circuit shown in FIG. 1 at various times during the transistor is switched on, FIG. 4 shows the waves in the resonators of down-conversion circuit shown in FIG. 1 at various times during the transistor is switched off, FIG. 5 shows the signal received by the differential amplifier shown in FIG. 1, FIG. 6 shows a block diagram of a mathematical model of a down-conversion circuit according to the present invention, FIG. 7 shows the transformation of the IIR structure shown in FIG. 6 into an equivalent FIR structure, FIG. 8 shows the definite product of pulse functions calculated in the mathematical model, and FIG. 9 shows the effective modulation signal calculated in the mathematical model, FIG. 10 shows a pulse train modulated sine wave calculated in the mathematical model, FIG. 11 shows the frequency relation between input and output signal calculated in the mathematical model, FIG. 12 shows a block diagram for simulating an RF channel selection according to the present invention, FIG. 13 shows the simulated magnitude over time of the transmitted signal of channel 1 and 2 and the received down-converted signal of the simulation arrangement shown in FIG. 12, and FIG. 14 shows the simulated phase over time of the transmitted signal of channel 1 and 2 and the received down-converted signal of the simulation arrangement shown in FIG. 12.

FIG. 1 shows a block diagram of a down-conversion circuit with a symmetric resonator structure according to the present invention. The down-conversion circuit includes a first and second $\lambda/2$ resonator $1a$, $1b$ connectable via a FET transistor 2 which is controlled by pulse generator 3. The voltage across the transistor is picked up by a differential amplifier 4 and the output signal of the differential amplifier 4 is received by a filter/integrator 5 which outputs the down-converted signal. The first and second $\lambda/2$ resonator $1a$, $1b$ can be realised by a micro-strip transmission line with open end (or equivalently open for the RF signal), a micro-strip transmission line with shortened end (or equivalently shortened end for the RF signal), an electronic circuit providing a delay at the feeding point equivalent to one wavelength $\lambda$ or directly by a dipole antenna.

The RF energy is collected in the $\lambda/2$ resonators $1a$, $1b$ during the resonating phase, wherein a differential RF signal is coupled to the $\lambda/2$ resonators $1a$, $1b$. In this phase the control voltage generated by the pulse generator 3 is zero and the FET transistor 2 is open. As the impedance of the RF current sources $6a$, $6b$ is very high as well as the input impedance of the differential amplifier 4 the $\lambda/2$ resonators $1a$, $1b$ are open on both sides and the waves in the $\lambda/2$ resonators $1a$, $1b$ are reflected at the resonator ends without a phase shift. In order to down-convert the RF signal the FET transistor 2 is switched on for a period equal (or almost equal) to half of the RF carrier period. During this phase the wave in the resonator $1a$ is partly reflected as the impedance is the line impedance of the resonator $1b$ plus the resistance of the FET transistor 2. The other part of the wave is going through the FET transistor 2 into the resonator $1b$. The channel width and therefore the "on resistance" of the FET transistor 2 is adjusted so that the reflected wave has the same amplitude as the wave going into the resonator $1b$. In this case the sum of the reflected wave in the resonator $1a$ and the passing wave from the resonator $1b$ is zero. The same applies to the resonator $1b$. Thus, after switching back to the resonator mode half of the waves in the $\lambda/2$ resonators $1a$, $1b$ are eliminated. Unwanted high frequency components are eliminated by the bandlimited differential amplifier 4 with low-pass characteristics and the down-converted baseband signal is outputted.

FIGS. 2 to 4 show the wave propagation in the $\lambda/2$ resonators $1a$, $1b$, wherein "0" represents the position of the FET transistor 2, "$-\lambda/2$" and "$\lambda/2$" represent the positions of RF current sources $6a$, $6b$, respectively, curve w1 shows the forward waves towards the FET transistor 2, curve w2 the reflected waves and curve w3 the superposition of both waves. In FIG. 2 the FET transistor 2 is open and the RF sources $6a$ and $6b$ are applied. At the beginning (FIG. 2$a$) no waves are present in the resonator. Then (FIG. 2$b$) the curve w1 shows that waves start to propagate from the RF sources $6a$ and $6b$ (position "$-\lambda/2$" and "$\lambda/2$") at the end of the $\lambda/2$ resonators $1a$, $1b$ towards the FET transistor 2 (position "0"). In FIG. 2$h$ the waves reach the FET transistor 2 (position "0"). As the FET transistor 2 is open the waves are reflected and travel towards the RF sources $6a$, $6b$ (position "$-\lambda/2$" and "$\lambda/2$"). The curve w3 shows the superposition of the waves. The discontinuity of the curve w3 in between both resonators across the transistor is caused by the differential RF feeding. This voltage across the FET transistor 2 is picked up by the differential amplifier 4. As long as no switching occurs this signal has the same frequency as the input signal and no low frequency signal is observed. As the resonance frequency of the $\lambda/2$ resonators $1a$, $1b$ are the same as the RF carrier frequency the wave amplitudes increase until the input power is the same as the loss in the $\lambda/2$ resonators $1a$, $1b$.

After several RF carrier oscillations the FET transistor 2 is switched on as shown in FIG. 3. It can be observed that the partly reflected and partly passing waves at the FET transistor 2 (position "0") eliminating each other in both $\lambda/2$ resonators $1a$, $1b$ (curve w3 in FIG. 3$a$–$g$). As the transistor is switched on for half of the RF carrier period half of the waves in the resonators are cancelled.

FIG. 4 shows the wave propagation after the FET transistor 2 is switched off again. The waves (curve w1) are fully reflected again at the FET transistor 2 (position "0") and propagate towards the RF sources $6a$, $6b$ again (curve w2) as shown in FIG. 4$b$–$o$. It is important to observe the superposition (curve w3) of the forward waves (curve w1) and the reflected waves (curve w2) across the FET transistor 2 in the position "0". In FIG. 4$a$–$g$ the curve w3 has a sinusoidal shape with a high amplitude whereas in FIG. 4$i$–$o$ the curve w3 also has a sinusoidal shape with a much smaller amplitude due to the half wave cancellation.

FIG. 5 shows the signal fed to the differential amplifier 4. The bars $x_1$ and $x_2$ mark the time during which the FET transistor 2 is switched on. The signal is integrated over each resonating phase and sampled before switching the FET transistor 2 on again in order to extract the down-converted signal and eliminate the undesired high frequency components.

FIG. 6 shows a mathematical model, that is used to explain the down-conversion functionality of the circuit according to the present invention. x(t) represents the RF input signal, m(t) is a pulse signal which is "1" during the resonance phase and "0" for half a RF carrier period in order to model the wave cancellation mentioned before. z(t) is the signal that is used as input of the integrator. The gain element k models the loss in the resonator and the delay element $\tau$ models the round trip delay of the wave in one resonator.

Equation (1a) and (1b) are directly obtained from FIG. 6.

$$y(t)=z(t)\cdot m(t)+x(t) \quad (1a)$$

$$z(t)=k\cdot y(t-\tau) \quad (1b)$$

The next step to obtain (2a) is to replace y(t−$\tau$) in equation (1b) by using equation (1a). This is done in order to transform the IIR structure of the circuit into an equivalent FIR structure as shown in FIG. 7. Afterwards (1b) is used to further transform (2a) and to obtain equation (2b). Replacing y(t−$\tau$) in equation (2b) like the transformation from (1b) to (2a) results in (2c).

$$z(t)=k\cdot z(t-\tau)\cdot m(t-\tau)+k\cdot x(t-\tau) \quad (2a)$$

$$z(t)=k^2\cdot y(t-2\tau)\cdot m(t-\tau)+k\cdot x(t-\tau) \quad (2b)$$

$$z(t)=k^2\cdot z(t-2\tau)\cdot m(t-2\tau)\cdot m(t-\tau)+k\cdot x(t-2\tau)\cdot m(t-\tau)+k\cdot x(t-\tau) \quad (2c)$$

As the input signal x(t) is a narrow band signal and resonance is assumed all time shifted versions of x(t) can be replaced. This assumption leads to equation (3a).

$$x(t)=x(t-j\cdot\tau), j=\{0,1,2,3,\ldots\} \quad (3a)$$

With (2c) and (3a) the infinite series (4a) is obtained for the output signal z(t).

$$z(t) = k^3 \cdot z(t-3\tau)\cdot m(t-3\tau)\cdot m(t-2\tau)\cdot m(t-\tau)+ \quad (4a)$$
$$k^3\cdot m(t-2\tau)\cdot m(t-\tau)\cdot x(t)+k^2\cdot m(t-\tau)\cdot x(t)+k\cdot x(t)$$
$$= k\cdot x(t)+x(t)\cdot \sum_{i=1}^{\infty}\left(k^{i+1}\cdot \prod_{j=1}^{i}m(t-j\cdot\tau)\right)$$

The formula for one down-conversion pulse m(t) is given in (5a). The resulting definite product is given in (5b). FIG. 8 shows the definite product of pulse functions m(t), $m_1(t)$ and $m_2(t)$.

$$m(t)=\begin{cases}0 & \text{for } -\frac{\tau}{2}\leq t<0\\ 1 & \text{else}\end{cases} \quad (5a)$$

$$m_i(t)=\prod_{j=1}^{i}m(t-j\cdot\tau)=\begin{cases}0 & \text{for } j\cdot\tau-\frac{\tau}{2}\leq t<j\cdot\tau \quad j=\{1,\ldots,i\}\\ 1 & \text{else}\end{cases} \quad (5b)$$

Replacing the definite Product in (4a) with (5b) leads to the equation (6a).

$$z(t)=k\cdot x(t)+x(t)\cdot\sum_{i=1}^{\infty}\left(k^{i+1}\cdot\prod_{j=1}^{i}m(t-j\cdot\tau)\right) \quad (6a)$$

-continued $$=k\cdot x(t)+x(t)\cdot\sum_{i=1}^{\infty}k^{i+1}\cdot m_i(t)$$

The modulation signal for the down-conversion is a pulse but the feedback structure leads to an effective modulation signal that is a train of pulses. In order to derive the effective modulation signal the indefinite series in (6a) is decomposed in (7a).

$$\sum_{i=1}^{\infty}k^{i+1}\cdot m_i(t)=\begin{cases}0, & \frac{\tau}{2}\leq t<\tau\\ \sum_{i=1}^{j}k^{i+1}, & j\tau+\frac{\tau}{2}\leq t<j\tau+\tau, \quad j=\{1,2,\ldots\}\\ \sum_{i=1}^{\infty}k^{i+1} & \text{else}\end{cases} \quad (7a)$$

The implicit definition of the effective modulation signal $m_{eff}(t)$ is given in equation (8a). Equation (6a) and (7a) are used to derive the explicit form of the effective modulation signal in equation (8b).

$$z(t)=m_{eff}(t)\cdot x(t) \quad (8a)$$

$$m_{eff}(t)=k+\sum_{i=1}^{\infty}k^{i+1}\cdot m_i(t) \quad (8b)$$

$$=\begin{cases}\sum_{i=0}^{j}k^{i+1}, & j\tau+\frac{\tau}{2}\leq t<j\tau+\tau \quad j=\{0,1,\ldots\}\\ \sum_{i=0}^{\infty}k^{i+1} & \text{else}\end{cases}$$

$$=\begin{cases}\frac{k-k^{2+j}}{1-k}, & j\tau+\frac{\tau}{2}\leq t<j\tau+\tau \quad j=\{0,1,\ldots\}\\ \frac{k}{1-k} & \text{else}\end{cases}$$

FIG. 9 shows the effective modulation signal $m_{eff}$ of one pulse (k=0.8). The feedback structure transforms the single pulse into an effective pulse train signal. The pulse train modulated sine wave z is shown in FIG. 10.

The finale step for the down-conversion is to integrate the output signal of the feedback structure z(t) after the pulse was applied. The resulting scalar is named r. The integral on the right side of (9a) can be decomposed into a sum of integrals over periods of $\tau/2$. In this case the effective modulation function $m_{eff}(t)$ is a constant in each integral and can be moved in front of it.

$$r=\int_0^{\infty}z(t)\cdot dt=\int_0^{\infty}m_{eff}(t)\cdot x(t)\cdot dt \quad (9a)$$

$$r=m_{eff}(0)\cdot\int_0^{\frac{\tau}{2}}x(t)\cdot dt+m_{eff}\left(\frac{\tau}{2}\right)\cdot\int_{\frac{\tau}{2}}^{2\tau}x(t)\cdot dt+\ldots \quad (9b)$$

$$=\sum_{i=0}^{\infty}\left(m_{eff}(i\tau)\cdot\int_{i\tau}^{i\tau+\frac{\tau}{2}}x(t)\cdot dt+m_{eff}\left(i\tau+\frac{\tau}{2}\right)\cdot\int_{i\tau+\frac{\tau}{2}}^{(i+1)\tau}x(t)\cdot dt\right)$$

$$=\sum_{i=0}^{\infty}\left(\frac{k}{1-k}\cdot\int_{i\tau}^{i\tau+\frac{\tau}{2}}x(t)\cdot dt+\frac{k-k^{2+i}}{1-k}\cdot\int_{i\tau+\frac{\tau}{2}}^{(i+1)\tau}x(t)\cdot dt\right)$$

Assuming an amplitude and phase modulated input signal x(t) with a carrier frequency of $1/\tau$ the equation (9b) can be further simplified.

$$x(t) = A \cdot \sin\left(\frac{2\pi}{\tau} t + \varphi\right) \quad (10a)$$

$$\int_{i\tau}^{i\tau + \frac{\tau}{2}} x(t) \cdot dt = \int_{i\tau}^{i\tau + \frac{\tau}{2}} A \cdot \sin\left(\frac{2\pi}{\tau} t + \varphi\right) \cdot dt \quad (10b)$$

$$= A \cdot \int_{0}^{\frac{\tau}{2}} \sin\left(\frac{2\pi}{\tau} t + \varphi\right) \cdot dt$$

$$= A \cdot \left[-\frac{\tau}{2\pi} \cos(\pi + \varphi) + \frac{\tau}{2\pi} \cos(\varphi)\right]$$

$$= \frac{A\tau}{\pi} \cos(\varphi)$$

$$\int_{i\tau + \frac{\tau}{2}}^{(i+1)\tau} x(t) \cdot dt = -\frac{A\tau}{\pi} \cos(\varphi) \quad (10c)$$

The next step is to replace the integrals in (9b) by the results of (10b) and (10c).

$$r = \sum_{i=0}^{\infty} \left( \frac{k}{1-k} \cdot \frac{A\tau}{\pi} \cdot \cos(\varphi) - \frac{k - k^{2+i}}{1-k} \cdot \frac{A\tau}{\pi} \cdot \cos(\varphi) \right) \quad (11a)$$

$$r = \frac{A\tau}{\pi} \cdot \cos(\varphi) \cdot \sum_{i=0}^{\infty} \left( \frac{k}{1-k} - \frac{k - k^{2+i}}{1-k} \right) \quad (11b)$$

$$= \frac{A\tau}{\pi} \cdot \cos(\varphi) \cdot \sum_{i=0}^{\infty} \frac{k^{2+i}}{1-k}$$

$$r = \frac{A\tau}{\pi} \cdot \left(\frac{k}{1-k}\right)^2 \cdot \cos(\varphi) \quad (11c)$$

The result in (11c) means that the output of the integrator is proportional to the amplitude of the input signal and also proportional to the cosine of the phase of the input signal when the transistor is switched off. So when the pulse repetition period is a multiple of $\tau$ the phase will always be the same and the integrator output will be a DC or constant signal over time. If the pulse repetition period is not a multiple of $\tau$ then the phase of the input signal will always be different for each applied pulse. In case that the pulse repetition period is almost a multiple of $\tau$ the phase will slightly increase or decrease linear over time with each applied pulse. The output of the integrator will be in this case a sinusoidal function. The phase difference of the input signal between two consecutive pulses is given in equation (12a). $T_p$ is the pulse repetition period. The function frac(x) is the fractional part of the argument x.

$$\Delta\varphi = \begin{cases} frac\left(\frac{T_p}{\tau}\right) \cdot 2\pi & frac\left(\frac{T_p}{\tau}\right) < 0.5 \\ \left[frac\left(\frac{T_p}{\tau}\right) - 1\right] \cdot 2\pi & \text{else} \end{cases} \quad (12a)$$

The frequency of the integrator output $f_{BB}$ for a sine wave input is given in equation (13a).

$$f_{BB} = \text{abs}\left(\frac{\Delta\varphi}{2\pi \cdot T_p}\right) \quad (13a)$$

$$= \begin{cases} \frac{1}{T_p} frac\left(\frac{T_p}{\tau}\right) & frac\left(\frac{T_p}{\tau}\right) < 0.5 \\ \frac{1}{T_p}\left[1 - frac\left(\frac{T_p}{\tau}\right)\right] & \text{else} \end{cases}$$

$$\frac{f_{BB}}{f_p} = \begin{cases} frac\left(\frac{f_{RF}}{f_p}\right) & frac\left(\frac{f_{RF}}{f_p}\right) < 0.5 \\ 1 - frac\left(\frac{f_{RF}}{f_p}\right) & \text{else} \end{cases} \quad (13b)$$

Equation (13b) is visualized in FIG. 11. It is obvious that an RF signal that fulfills the upper condition in (13b) is frequency shifted to baseband.

According to the equation (13b), assuming an RF input signal consisting of two RF channels at centre frequencies $f_{RF1}$=1000 MHz and $f_{RF2}$=1002 MHz and the pulse repetition rate is $f_p$=19.9 MHz, the channel 1 is down-converted to $f_{IF1}$=5 MHz and the channel 2 is down-converted to $f_{IF2}$=7 MHz. Further, if the pulse repetition rate is $f_p$=19.94 MHz channel 1 is down-converted to $f_{IF1}$=3 MHz and channel 2 is down-converted to $f_{IF2}$=5 MHz. At the output of the bandpass filter with a fixed passband of 5 MHz±1 MHz the down-converter converted RF channel 1 would appear when a pulse repetition rate of $f_p$=19.9 MHz is used and the down-converter converted RF channel 2 would appear when a pulse repetition rate of 19.94 MHz is used. The example shows that the tuning range of the oscillator for generating the pulse repetition rates is much smaller than in an state of the art mixer architecture where the different local oscillator frequencies for selecting different channels has the same spacing as the RF channels. The local oscillator tuning range in state of the art mixer needs to be the same as the RF band to cover.

FIG. 12 shows a block diagram for simulating an RF channel selection according to the present invention. The block TX1 generates a first random RF signal with a centre frequency of 1000 MHz and a bandwidth of 1 MHz and the block TX2 generates a second random signal with a centre frequency of 1002 MHz and also a bandwidth of 1 MHz. The sum of the signals is calculated by the sum calculator 13 and fed to the pole switch down-converter 9. The pulse generator 8 generates control pulses with a rate of 19.9 MHz or 19.94 MHz depending on the channel select signal received from the channel selector 7, wherein the channel selector 7 is set to switch the channel after 50 μs. The width of the pulses is 0.5 ns which is approximately half of the RF carrier frequency period. The passband of the intermediate frequency bandpass filter 10 is 5 MHz±1 MHz. The mixer block 11 samples the filter output from the bandpass filter 10 and carries out a digital IQ down-conversion. The mixer block 11 also contains a lowpass filter for suppressing remaining adjacent channels. The first and second random RF signal and the output from the mixer block 11 are supplied to the signal monitor 12.

FIG. 13 shows the magnitude and FIG. 14 the phase over time of the transmitted signal of channel 1 and 2 and the received down-converted signal. Between 0 and 50 μs the down-converted signal corresponds to channel 1 afterwards the pole switch repetition rate is changed by the pulse generator 8 and the channel 2 appears at the down-converter output. Thus, with the present invention, adjacent RF channels can be selected by slightly varying the pole switch repetition rate so that the desired band is down-converted to a fixed intermediate frequency.

| 1a, 1b | λ/2 resonator, |
| 2 | switching means, FET transistor |
| 3 | pulse generator, |
| 4 | differential amplifier, |
| 5 | filter/integrator, |
| 6a, 6b | RF current sources, |
| 7 | channel selector, |
| 8 | pulse generator, |
| 9 | down-converter, |
| 10 | bandpass filter, |
| 11 | mixer, |
| 12 | signal monitor, |
| 13 | signal sum calculator, |
| w1 | forward wave, |
| w2 | reflected wave, |
| w3 | superposition of forward wave and reflected wave, |
| TX1, TX2 | random RF signal generator. |

The invention claimed is:

1. A circuit for down-converting a modulated signal comprising:
    a first and second λ/2 resonator for collecting RF energy, wherein a differential RF signal is coupled to said first and second λ/2 resonator;
    a switching means coupled at one end of the first λ/2 resonator and one end of second λ/2 resonator for connecting said first and second λ/2 resonator;
    a control means for controlling said switching means; and
    a detecting means coupled to said first and second λ/2 resonator for detecting the down-converted signal, wherein
    said control means is adapted to initiate in a down-conversion cycle of said switching means to connect said first and second λ/2 resonator for approximate half of the RF carrier period of the modulated signal.
2. A circuit according claim 1, wherein
    said control means is adapted to initiate said detecting means to detect the down-converted signal after said switching means is switched off.
3. A circuit according claim 1, wherein
    said switching means is a FET transistor.
4. A circuit according to claim 1, wherein
    said detecting means is a differential amplifier.
5. A circuit according to claim 1, further comprising
    a means for generating the differential RF signal coupled to said first and second λ/2 resonator.
6. A circuit according to claim 1, wherein
    said first and second λ/2 resonator is a micro-strip transmission line with open end or equivalently open for the RF signal.
7. A circuit according to claim 6, wherein
    said detecting means comprises a bandpass filter for filtering intermediate frequency signal.
8. A circuit according to claims 1, wherein
    said first and second λ/2 resonator is a micro-strip transmission line with shortened end or equivalently shortened end for the RF signal.
9. A circuit according to claim 1, wherein
    said first and second λ/2 resonator is an electronic circuit providing a delay at the feeding point equivalent to one wavelength λ.
10. A circuit according to claim 1, wherein
    said first and second λ/2 resonator is each one arm of a dipole antenna.
11. A circuit according to claim 1, wherein
    for selecting a predetermined modulated signal from a plurality of adjacent RF channels said control means is adapted to initiate said switching means to change the switch rate according to $$f_{IF} = \begin{cases} frac\left(\dfrac{f_{RF}}{f_p}\right) \cdot f_p & frac\left(\dfrac{f_{RF}}{f_p}\right) < 0.5 \\ \left(1 - frac\left(\dfrac{f_{RF}}{f_p}\right)\right) \cdot f_p & \text{else} \end{cases}$$

wherein,
    $f_{IF}$ is intermediate frequency of the down-converted signal,
    $f_{RF}$ centre frequency of the RF channel,
    $f_p$ is the switch rate, and
    frac(x) is the fractional part of the argument x.
12. A method for down-converting a modulated signal, comprising the steps of:
    providing a first and second λ/2 resonator for collecting RF energy,
    coupling a differential RF signal to said first and second λ/2 resonator;
    connecting after said first and second λ/2 resonator oscillate, said first and second λ/2 resonator for approximate half of the RF carrier period of the modulated signal; and
    detecting the down-converted signal.
13. A method according claim 12, wherein
    the down-converted signal is detected after said first and second λ/2 resonator are disconnected.
14. A method according to claim 12 wherein
    in said detecting step a differential signal at the ends at which said first and second λ/2 resonator are connected is detected.
15. A method according to claim 12, further comprising the step of
    generating the differential RF signal which is coupled to said first and second λ/2 resonator.
16. A method according to claim 12, wherein
    said first and second λ/2 resonator is a micro-strip transmission line with open end or equivalently open for the RF signal.
17. A method according to claim 12, wherein
    said first and second λ/2 resonator is a micro-strip transmission line with shortened end or equivalently shortened end for the RF signal.
18. A method according to claim 12, wherein
    said first and second λ/2 resonator is an electronic circuit providing a delay at the feeding point equivalent to one wavelength λ.
19. A method according to claim 12, wherein
    said first and second λ/2 resonator is each one arm of a dipole antenna.
20. A method according to claim 12 further comprising the step of
    changing the switch rate for selecting a predetermined modulated signal from a plurality of adjacent RF channels according to:

$$f_{IF} = \begin{cases} frac\left(\dfrac{f_{RF}}{f_p}\right) \cdot f_p & frac\left(\dfrac{f_{RF}}{f_p}\right) < 0.5 \\ \left(1 - frac\left(\dfrac{f_{RF}}{f_p}\right)\right) \cdot f_p & \text{else} \end{cases}$$

wherein, $f_{IF}$ is intermediate frequency of the down-converted signal, $f_{RF}$ centre frequency of the RF channel, $f_p$ is the switch rate, and frac(x) is the fractional part of the argument x.

21. A method according to claim 20, further comprising the step of filtering the intermediate frequency by a bandpass filter.

* * * * *